(12) United States Patent
Islam et al.

(10) Patent No.: US 10,728,072 B2
(45) Date of Patent: Jul. 28, 2020

(54) SYMBOL AND SUBFRAME ALIGNMENT IN A FRAME STRUCTURE OF A WIRELESS COMMUNICATION SYSTEM

(71) Applicant: Huawei Technologies Co., Ltd., Shenzhen (CN)

(72) Inventors: Toufiqul Islam, Ottawa (CA); Kelvin Kar Kin Au, Kanata (CA); Jianglei Ma, Ottawa (CA); Liqing Zhang, Ottawa (CA); Zhenfei Tang, Kanata (CA)

(73) Assignee: Huawei Technologies Co., Ltd., Shenzhen (CN)

(*) Notice: Subject to any disclaimer, the term of this patent is extended or adjusted under 35 U.S.C. 154(b) by 15 days.

(21) Appl. No.: 16/229,813

(22) Filed: Dec. 21, 2018

(65) Prior Publication Data
US 2019/0386862 A1    Dec. 19, 2019

Related U.S. Application Data

(63) Continuation of application No. PCT/CN2017/091513, filed on Jul. 3, 2017.

(60) Provisional application No. 62/371,104, filed on Aug. 4, 2016, provisional application No. 62/382,658, filed on Sep. 1, 2016.

(51) Int. Cl.
*H04L 27/26* (2006.01)
*H04L 5/00* (2006.01)
*H04W 72/04* (2009.01)

(52) U.S. Cl.
CPC .......... *H04L 27/2607* (2013.01); *H04L 5/001* (2013.01); *H04L 27/2626* (2013.01); *H04W 72/0453* (2013.01)

(58) Field of Classification Search
None
See application file for complete search history.

(56) References Cited

U.S. PATENT DOCUMENTS

| 2011/0268135 | A1 | 11/2011 | Kim et al. |
| 2013/0129017 | A1 | 5/2013 | Sahin et al. |
| 2016/0352551 | A1* | 12/2016 | Zhang ................. H04L 27/2646 |

(Continued)

FOREIGN PATENT DOCUMENTS

| CN | 1921470 A | 2/2007 |
| CN | 1960350 A | 5/2007 |

(Continued)

OTHER PUBLICATIONS

3rd Generation Partnership Project; Technical Specification Group Radio Access Network; Physical layer aspects for evolved Universal Terrestrial Radio Access (UTRA) (Release 7), 3GPP TR 25.814 V7.1.0, Sep. 2006, 132 pages.

(Continued)

*Primary Examiner* — Eunsook Choi
(74) *Attorney, Agent, or Firm* — Slater Matsil, LLP

(57) ABSTRACT

The time-frequency resources of a particular numerology may be used to transmit OFDM symbols that have a cyclic prefix that is longer than the cyclic prefix of other OFDM symbols. This may complicate alignment across different numerologies. Time-frequency resource partitions are disclosed herein that may assist in symbol alignment and/or subframe alignment across the different numerologies.

32 Claims, 29 Drawing Sheets

(56) References Cited

U.S. PATENT DOCUMENTS

| | | | | |
|---|---|---|---|---|
| 2019/0116007 A1* | 4/2019 | Yi | ............................ | H04W 4/42 |
| 2019/0173553 A1* | 6/2019 | Park | ...................... | H04B 7/0617 |
| 2019/0245730 A1 | 8/2019 | Yi et al. | | |
| 2019/0306855 A1* | 10/2019 | Tiirola | ................. | H04L 27/2605 |
| 2019/0342838 A1* | 11/2019 | Kwak | ................... | H04L 5/0082 |

FOREIGN PATENT DOCUMENTS

| | | |
|---|---|---|
| CN | 101114874 A | 1/2008 |
| CN | 101175058 A | 5/2008 |
| CN | 101184076 A | 5/2008 |
| CN | 100502379 C | 6/2009 |
| JP | 2019518377 A | 6/2019 |
| WO | 2017204511 A1 | 11/2017 |

OTHER PUBLICATIONS

Xinwei, "Considerations on 5G New RAT Numerology," 3GPP TSG RAN WG1 Meeting #84b, R1-163118, Busan, Korea, Apr. 11-15, 2016, 4 pages.

Qualcomm, et al., "WF on Scalable Numberology Symbol Boundary Alignment," 3GPP TSG RAN WG1 #85, R1-165583, Nanjing, China, May 23-27, 2016, 6 pages.

Huawei et al., "Discussion on frame structure for NR", 3GPP TSG RAN WG1 #85, R1-164032, May 23-27, 2016, 8 Pages, Nanjing, China.

Qualcomm Incorporated, "Numerology and TTI multiplexing for NR Forward Compatibility Analysis", 3GPP TSG-RAN WG1 #85, R1-164692, 23rd-27th may, 2016, 8 Pages, Nanjing, China.

\* cited by examiner

| Parameters | Set 1 | Set 2 | Set 3 | Set 4 | Set 5 | Set 6 | Set 7 |
|---|---|---|---|---|---|---|---|
| Subcarrier-spacing(kHz) | 7.5 | 15 | 30 | 60 | 120 | 240 | 480 |
| OFDM symbol duration $t_s$ (usec) | 133.33 | 66.67 | 33.33 | 16.67 | 8.33 | 4.17 | 2.08 |
| CP-length (usec) | 10.42(long) 9.38(regular) | 5.21(long) 4.69(regular) | 2.60(long) 2.34(regular) | 1.30(long) 1.17(regular) | 0.65(long) 0.59(regular) | 0.33(long) 0.29(regular) | 0.16(long) 0.15(regular) |
| Excess CP (usec)(long CP length minus short CP length) | 1.04 | 0.52 | 0.26 | 0.13 | 0.06 | 0.04 | 0.01 |
| No. of symbols per subframe | 7 | 7 | 7 | 7 | 7 | 7 | 7 |
| Subframe length (ms) | 1 | 0.5 | 0.25 | 0.125 | 0.0625 | 0.03125 | 0.015625 |
| CP overhead | 6.67% | 6.67% | 6.67% | 6.67% | 6.67% | 6.67% | 6.67% |

FIG. 5

```
┌─────────────────────────────────────────────────────────┐
│ Transmit k consecutive OFDM symbols having a first       │
│ subcarrier spacing, where a first OFDM symbol of the k   │
│ consecutive OFDM symbols has a time duration $t_1$, and  │
│ the remaining OFDM symbols of the k consecutive OFDM     │
│ symbols each have a time duration $t_2 < t_1$            │
│                        1302                              │
└─────────────────────────────────────────────────────────┘
                            │
                            ▼
┌─────────────────────────────────────────────────────────┐
│ Transmit n>k consecutive OFDM symbols having a second    │
│ subcarrier spacing greater than the first subcarrier     │
│ spacing, where a first OFDM symbol of the n consecutive  │
│ OFDM symbols has a time duration $t_3$, and the          │
│ remaining OFDM symbols of the n consecutive OFDM         │
│ symbols each have a time duration $t_4 < t_3$            │
│                        1304                              │
└─────────────────────────────────────────────────────────┘
```

FIG. 41

```
┌─────────────────────────────────────────────────────────┐
│                      (Optional)                          │
│                 Generate OFDM symbols                    │
│                        1402                              │
└─────────────────────────────────────────────────────────┘
                            │
                            ▼
┌─────────────────────────────────────────────────────────┐
│ Transmit k consecutive OFDM symbols over a set of        │
│ subcarriers having a subcarrier spacing of $15\,kHz       │
│ \times 2^n$, where n is an integer and $n \geq 1$, and    │
│ where a first OFDM symbol of the k consecutive OFDM      │
│ symbols has a time duration $t_1$, and the remaining     │
│ OFDM symbols of the k consecutive OFDM symbols each      │
│ have a time duration $t_2 < t_1$                         │
│                        1404                              │
└─────────────────────────────────────────────────────────┘
```

FIG. 42

SYMBOL AND SUBFRAME ALIGNMENT IN A FRAME STRUCTURE OF A WIRELESS COMMUNICATION SYSTEM

CROSS-REFERENCE TO RELATED APPLICATIONS

This application is a continuation of PCT application PCT Application No. PCT/CN2017/091513, entitled "Symbol and Subframe Alignment in a Wireless Communication System" and filed Jul. 3, 2017, which claims the benefit of U.S. Provisional Patent Application No. 62/371,104, entitled "Symbol and Subframe Alignment in a Frame Structure of a Wireless Communication System" and filed on Aug. 4, 2016, and of U.S. Provisional Patent Application No. 62/382,658, entitled "Symbol Boundary Alignment for Different Reference Numerologies" and filed on Sep. 1, 2016, all of which applications are hereby incorporated herein by reference in their entireties.

TECHNICAL FIELD

The present application relates to wireless communication, and more specifically to symbol and/or subframe alignment across different numerologies in a wireless communication system.

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources.

Time-frequency resources are allocated for communications between UEs and a base station. Multiple access occurs when more than one UE is scheduled on a set of time-frequency resources. Each UE uses a portion of the time-frequency resources to receive data from the base station in the case of a downlink communication, or to transmit data to the base station in the case of an uplink communication.

Wireless communications between the base station and the UEs may be performed by transmitting orthogonal frequency-division multiplexing (OFDM) symbols. The frequency spacing used between the subcarriers of an OFDM symbol is called the subcarrier spacing.

It may be desirable to have some level of alignment between OFDM symbols having different subcarrier spacings.

SUMMARY

A carrier transmitting a signal of OFDM symbols has a "numerology". The numerology of the carrier refers to the subset of physical layer parameters used to transmit the signal. The numerology may include a combination or subset of: a transmission time unit (TTU) or transmission time interval (TTI) used to transmit the signal over the carrier, an OFDM symbol duration of OFDM symbols transmitted over the carrier, a cyclic prefix (CP) length within each OFDM symbol transmitted over the carrier, and a subcarrier spacing between subcarrier frequencies over which the signal is transmitted. Therefore, a particular subcarrier spacing may correspond to a particular numerology.

Different numerologies may coexist. For example, a base station may employ two numerologies as follows: in a first frequency subband the base station may send and receive OFDM symbols that have a subcarrier spacing of 15 kHz, and in a second frequency subband the base station may send and receive OFDM symbols that have a subcarrier spacing of 30 kHz.

It may be desirable to have some level of alignment across different numerologies. However, the time-frequency resources of a particular numerology may be used to transmit OFDM symbols with two or more different cyclic prefix lengths. This may complicate alignment across different numerologies.

Time-frequency resource partitions are disclosed herein that may assist in symbol alignment and/or subframe alignment across the different numerologies. In some embodiments, a long cyclic prefix, or the extra portion of a long cyclic prefix, is used as part of a guard period between downlink and uplink OFDM symbols.

In one embodiment, there is provided a method for transmitting data in a wireless communication system. The method includes transmitting k consecutive OFDM symbols having a first subcarrier spacing. A first OFDM symbol of the k consecutive OFDM symbols have a time duration $t_1$, and the remaining OFDM symbols of the k consecutive OFDM symbols each have a time duration $t_2 < t_1$. The total time duration of the k consecutive OFDM symbols is T ms. The method further includes transmitting n>k consecutive OFDM symbols having a second subcarrier spacing greater than the first subcarrier spacing. A first OFDM symbol of the n consecutive OFDM symbols has a time duration $t_3$, and the remaining OFDM symbols of the n consecutive OFDM symbols each has a time duration $t_4 < t_3$. The total time duration of the n consecutive OFDM symbols is also T ms. In one embodiment, T=0.5 ms. In another embodiment, T=0.25 ms.

In another embodiment, there is provided a method for transmitting data in a wireless communication system. The method includes transmitting k consecutive OFDM symbols over a set of subcarriers having a subcarrier spacing of 15 kHz×$2^n$, where n is an integer and n≥1. A first OFDM symbol of the k consecutive OFDM symbols has a time duration $t_1$, and the remaining OFDM symbols of the k consecutive OFDM symbols each have a time duration $t_2 < t_1$. The total time duration of the k consecutive OFDM symbols is T ms. In one embodiment, T=0.5 ms. In another embodiment, T=0.25 ms.

In another embodiment, there is provided a method for transmitting data in a wireless communication system. The method includes transmitting a plurality of OFDM symbols according to a frame structure. The frame structure includes k>1 consecutive OFDM symbol durations, immediately followed by j>1 consecutive OFDM symbol durations. The k consecutive OFDM symbol durations and the j consecutive OFDM symbol durations are within the same subframe. Each one of the k consecutive OFDM symbol durations has a time duration $t_1$ and a first cyclic prefix (CP) length. Each one of the j consecutive OFDM symbol durations has a time duration $t_2 > t_1$ and a second CP length greater than the first CP length.

Optionally, in any of the previous embodiments, the n consecutive OFDM symbols are transmitted concurrently with the k consecutive OFDM symbols.

Optionally, in any of the previous embodiments, the k consecutive OFDM symbols are transmitted over a first set of subcarriers at the first subcarrier spacing, and wherein the n consecutive OFDM symbols are transmitted over a second set of subcarriers at the second subcarrier spacing.

Optionally, in any of the previous embodiments, the first set of subcarriers and the second set of subcarriers belong to different carriers.

Optionally, in any of the previous embodiments, the first set of subcarriers and the second set of subcarriers belong to the same carrier.

Optionally, in any of the previous embodiments, the first subcarrier spacing is 15 kHz and the second subcarrier spacing is 30 kHz.

Optionally, in any of the previous embodiments, the first subcarrier spacing is 30 kHz and the second subcarrier spacing is 60 kHz.

Optionally, in any of the previous embodiments, k=7 and n=14.

Optionally, in any of the previous embodiments: the first OFDM symbol of the k consecutive OFDM symbols has a cyclic prefix that is longer than a cyclic prefix of each one of the remaining OFDM symbols of the k consecutive OFDM symbols; and the first OFDM symbol of the n consecutive OFDM symbols has a cyclic prefix that is longer than a cyclic prefix of each one of the remaining OFDM symbols of the n consecutive OFDM symbols.

Optionally, in any of the previous embodiments, a trailing edge of the first OFDM symbol of the k consecutive OFDM symbols is aligned with a trailing edge of the second OFDM symbol of then consecutive OFDM symbols.

Optionally, in any of the previous embodiments, the second subcarrier spacing is an integer multiple of the first subcarrier spacing.

Optionally, in any of the previous embodiments, the integer multiple is a power of two.

Optionally, in any of the previous embodiments, the first subcarrier spacing is 15 kHz$\times 2^i$, where i is an integer and i≥0, and wherein the second subcarrier spacing is 15 kHz$\times 2^j$, where j is an integer and j>i.

Optionally, in any of the previous embodiments, the method is performed by a base station.

Corresponding base stations, UEs, and transmitters are disclosed that may be configured to perform the methods described herein.

BRIEF DESCRIPTION OF THE DRAWINGS

Embodiments will be described, by way of example only, with reference to the accompanying figures wherein:

FIG. 5 illustrates a table showing parameters for different numerologies;

FIGS. 41 to 43 are example transmission methods.

DETAILED DESCRIPTION OF ILLUSTRATIVE EMBODIMENTS

For illustrative purposes, specific example embodiments will now be explained in greater detail below in conjunction with the figures.

Figure 1:
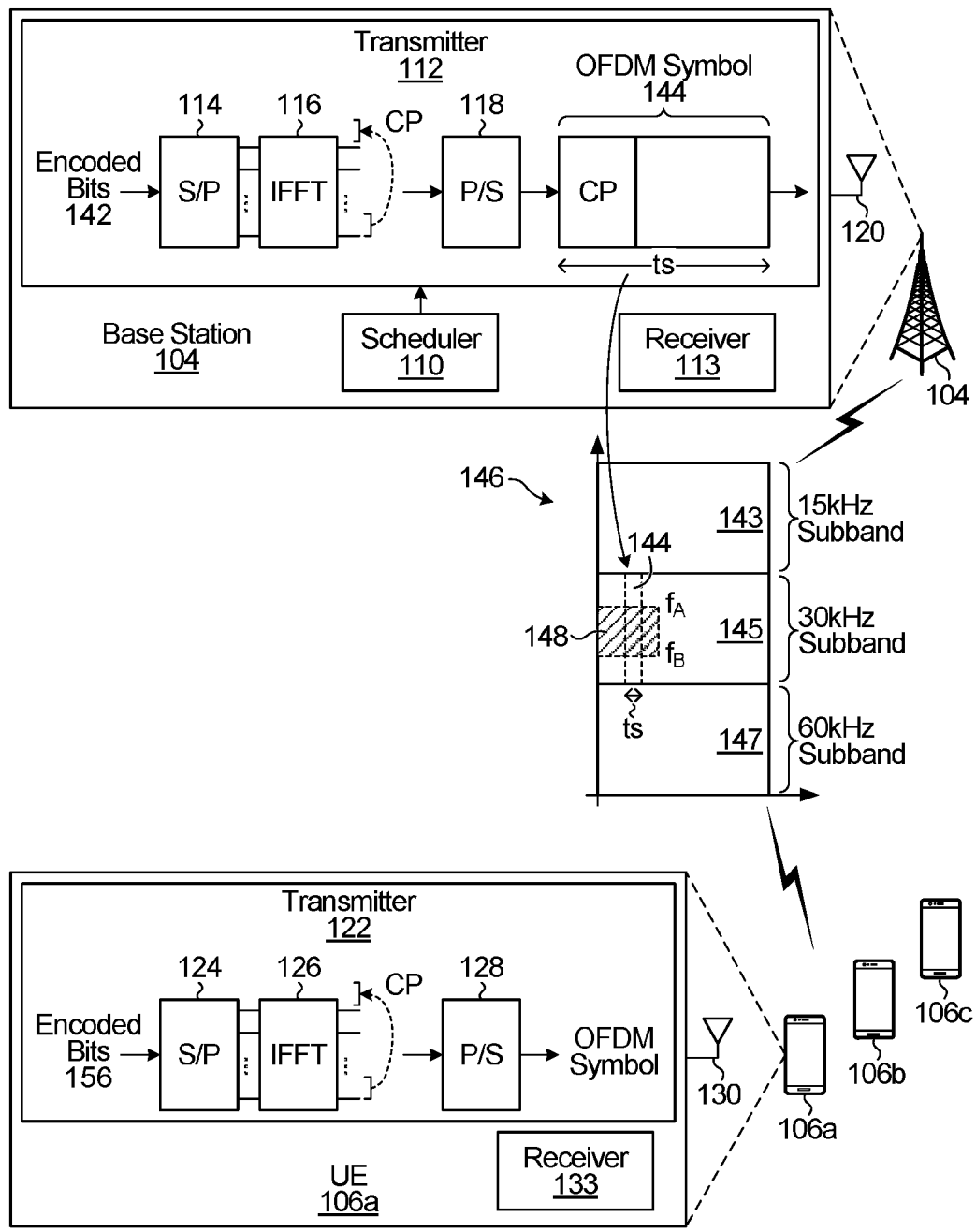
FIG. 1 is a block diagram of a wireless communication system, according to one embodiment.

FIG. 1 is a block diagram of a wireless communication system, according to one embodiment. The wireless communication system includes a base station 104, which communicates with UEs 106*a-c*.

The base station 104 may be part of an access network (not illustrated). The word "base station" encompasses any device that wirelessly communicates with UEs. Therefore, in some implementations, the base station 104 may be called other names, such as a transmit and receive point (TRP), a base transceiver station, a radio base station, a network node, a transmit/receive node, a Node B, an eNodeB (eNB), a gNB, which is sometimes called a "gigabit" Node B, a relay station, or a remote radio head. Also, in some embodiments, the functions of the base station 104 may be distributed. For example, some of the components of the base station 104 may be located remote from the equipment housing the antennas of the base station 104, and may be coupled to the equipment housing the antennas over a communication link (not shown).

An example of base station 104 is illustrated in more detail in FIG. 1. Base station 104 includes a scheduler no and a transmitter 112. The transmitter 112 implements at least some of the downlink physical layer. The transmitter 112 includes a serial-to-parallel converter 114, an inverse fast fourier transform (IFFT) block 116 that implements the IFFT algorithm, and a parallel-to-serial converter 118. The base station 104 further includes at least one antenna 120 for sending and receiving OFDM symbols. Only one antenna is illustrated. The transmitter 112 may include other components also, e.g. a forward error correction (FEC) encoder, but these other components have been omitted for the sake of clarity. The base station 104 also includes other components, e.g. a receiver 113 for receiving uplink messages from the UEs, but the details of the other components have been omitted for the sake of clarity.

The scheduler no and the IFFT block 116 and other components of the transmitter 112 may be implemented by a processor that executes instructions that causes the processor to perform the operations of the scheduler no and the IFFT block 116 and the other components of the transmitter 112. A different processor may be used to implement each one of the scheduler no and the IFFT block 116 and the other components of the transmitter 112, or the same processor may be used. Alternatively, the scheduler no and/or the IFFT block 116 and/or the other components of the transmitter 112 may be implemented using dedicated integrated circuitry, such as an application specific integrated circuit (ASIC), a graphics processing unit (GPU), or a programmed field programmable gate array (FPGA) for performing the functions of the scheduler no and/or the IFFT block 116 and/or the other components of the transmitter 112.

The UE 106a is also illustrated in more detail in FIG. 1 and includes a transmitter 122. The transmitter 122 implements at least some of the uplink physical layer. The transmitter 122 includes a serial-to-parallel converter 124, an IFFT block 126 for implementing the IFFT algorithm, and a parallel-to-serial converter 128. The UE 106a further includes at least one antenna 130 for sending/receiving OFDM symbols. Only one antenna is illustrated. The transmitter 122 may include other components also, e.g. a FEC encoder, but these other components have been omitted for the sake of clarity. The UE 106a also includes other components, e.g. a receiver 133 for receiving downlink messages from the base station 100, but the details of the other components have been omitted for the sake of clarity.

The IFFT block 126 and other components of the transmitter 122 may be implemented by a processor that executes instructions that causes the processor to perform the operations of the IFFT block 126 and the other components of the transmitter 122. Alternatively, the IFFT block 126 and/or the other components of the transmitter 122 may be implemented using dedicated integrated circuitry, such as an ASIC, a GPU, or a FPGA for performing the functions of the IFFT block 126 and/or the other components of the transmitter 122.

In operation, encoded bits 142 at the base station 104 are transmitted to UEs served by the base station 104 via one or more OFDM symbols. A block of the encoded bits 142, in serial form, is presented in parallel to the input of the IFFT block 116 using the serial-to-parallel converter 114. The IFFT block 116 implements an inverse discrete fourier transform operation to result in a plurality of OFDM symbol samples. A cyclic prefix (CP) is added to the beginning of the OFDM symbol samples by repeating the last m symbol samples at the beginning of the OFDM symbol samples. The CP may assist in mitigating inter-symbol interference and/or may enable the application of circular-convolution signal processing techniques. The CP duration may be between ¼ and 1/32 of the useful symbol duration, and may be set according to the length of the multipath channel.

After the CP is added to the beginning of the OFDM symbol samples, the CP and symbol samples are converted into serial form, using parallel-to-serial converter 118, to result in an OFDM symbol 144 having a time duration of $t_s$. The OFDM symbol 144 is transmitted using part of a set of time-frequency resources 146.

OFDM symbol 144 is only one symbol in the set of time-frequency resources 146. The set of time-frequency resources 146 comprises a stream of OFDM symbols, one after another. Also, the set of time-frequency resources 146 is partitioned into three subbands: one subband 143 in which the OFDM symbols have a subcarrier spacing of 15 kHz, another subband 145 in which the OFDM symbols have a subcarrier spacing of 30 kHz, and another subband 147 in which the OFDM symbols have a subcarrier spacing of 60 kHz. The OFDM symbol 144 has a subcarrier spacing of 30 kHz and falls within subband 145.

Note that not all of the frequencies in the OFDM symbol 144 are necessarily used to transmit data to the UE 106a. Instead, some of the frequencies in the OFDM symbol 144 may be used to transmit data to other UEs served by the base station 106. For example, block 148, shown in hatching, indicates a block of resources assigned to UE 106a. The block of resources 148 includes a set of frequencies $f_A$ to $f_B$. UE 106a is assigned the set of frequencies $f_A$ to $f_B$ over the course of several OFDM symbols, for a particular duration in time. The duration in time may be equal to a transmission time unit (TTU), a subframe, and/or a scheduling interval in some embodiments.

The scheduler no determines which resources in the set of time-frequency resources 146 are to be assigned to UE 106a. The scheduler no uses a scheduling algorithm to decide which UE should be assigned to which resources. An example of a scheduling algorithm that may be used by the scheduler no is a proportionally fair (PF) scheduling algorithm. The scheduler no may grant resource partitions of different sizes to different UEs.

The operation of the UE 106a in the uplink is similar to the base station downlink. A partition of uplink resources is used by UE 106a to transmit encoded bits 156 via OFDM symbols. A group of the encoded bits 156, in serial form, are presented in parallel to the input of the IFFT block 126 using the serial-to-parallel converter 124. The IFFT block 126 implements an inverse discrete fourier transform operation to result in a plurality of OFDM symbol samples.

UEs 106b and 106c may communicate with the base station 104 using a numerology different from UE 106a. As an example, UE 106b may communicate with base station 104 using OFDM symbols having a subcarrier spacing of 15 kHz, via subband 143. As another example, UE 106c may communicate with base station 104 using OFDM symbols having a subcarrier spacing of 60 kHz, via subband 147.

Note that FIG. 1 is only one example. In another example, base station 104 may instead actually be multiple base stations cooperating to serve UEs, and the scheduler no may reside in a controller. In yet another example, there may be separate base stations transmitting and receiving communications, with each base station using a different numerology. Also, three subbands are illustrated in FIG. 1, but there may be more or fewer subbands. Also, different numerologies may be used from that illustrated in FIG. 1.

Figure 2:
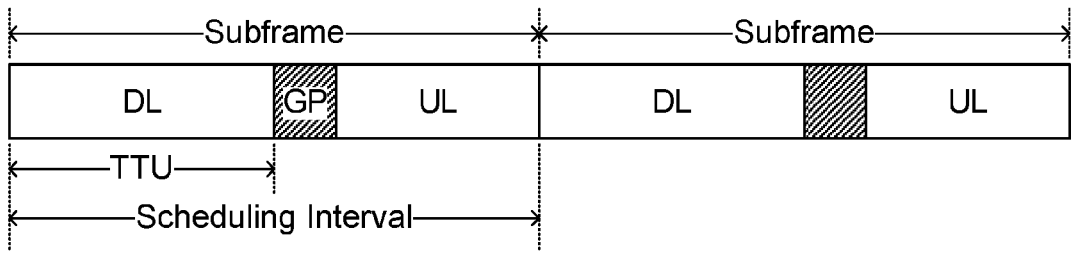
FIGS. 2 and 3 respectively illustrate two example relationships between a subframe, a transmission time unit (TTU), and a scheduling interval.
Figure 3:
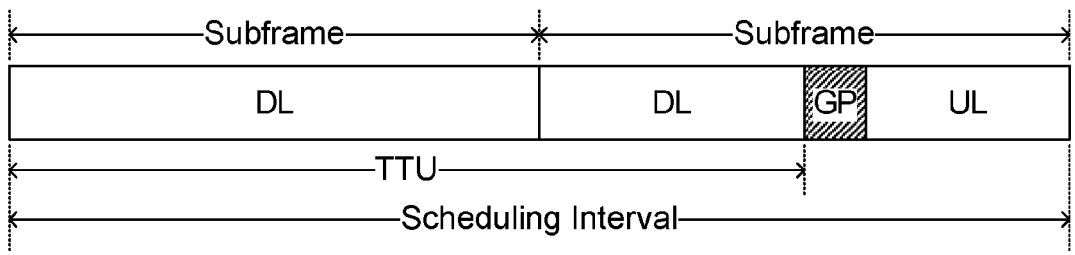

A set of time-frequency resources may be partitioned into different time intervals, such as subframes, transmission time units (TTU), scheduling intervals, etc. A subframe may have multiple TTUs, or exactly one TTU, depending upon the embodiment. In some embodiments, a TTU may even be longer than a subframe. A TTU is sometimes called a transmission time interval (TTI). A scheduling interval typically includes at least one TTU, and a scheduling interval may have a duration in time that is equal to, longer than, or shorter than a subframe, depending upon the embodiment. FIGS. 2 and 3 respectively illustrate two example relationships between a subframe, a TTU, and a scheduling interval. The "DL" refers to one or more downlink OFDM symbols having a particular subcarrier spacing, the "UL" refers to one or more uplink OFDM symbols having the same subcarrier spacing, and the "GP" refers to a guard period between uplink and downlink. In FIG. 2, a subfame is longer than a single TTU, and a scheduling interval is equal to a subframe duration. In FIG. 3, a scheduling interval equals two subframes, and a TTU is longer than a single subframe. In both FIGS. 2 and 3, the scheduling interval includes the TTU. FIGS. 2 and 3 are only examples.

In embodiments below, the term subframe will be used. For example, the concept of subframe alignment is discussed below. However, subframe alignment may also be called other names, such as TTU alignment or scheduling interval alignment, depending upon the embodiment. For example, if a subframe happens to have the same duration as a TTU, then subframe alignment may be interchangeably called TTU alignment.

A subframe in a long term evolution (LTE) system has a specific definition: 1 ms consisting of two 0.5 ms slots. FIG.

4 illustrates one slot in an LTE system. The slot has a duration of seven OFDM symbols. In an LTE system, the CP of the first OFDM symbol of each slot is approximately 0.52 μs longer than the CP of each of the subsequent six OFDM symbols in the slot. An OFDM symbol having a longer CP is shown using hatching along the top of the OFDM symbol, as at 166.

Figure 4:
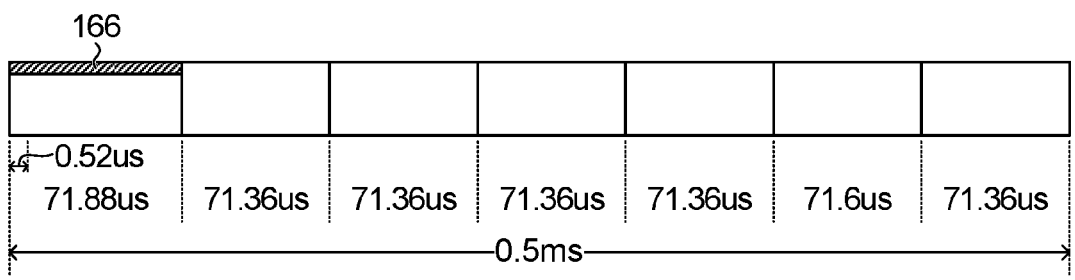
FIG. 4 illustrates one slot in a long term evolution (LTE) system.

Regardless of the subcarrier frequency spacing, when a particular time interval includes an OFDM symbol that has a CP that is longer than the CP of other OFDM symbols, then the OFDM symbol having the longer CP will be referred to as a "long CP OFDM symbol". The other OFDM symbols in the time interval will each be referred to as a "regular CP OFDM symbol". In FIG. 4, there is one long CP OFDM symbol, indicated by hatching 166, followed by six regular CP OFDM symbols in the time interval comprising one LTE slot.

In FIG. 4, the sum of the durations of each OFDM symbol (6×71.36 μs+71.88 μs) in each slot is equal to 0.5 ms. Note that the duration of each OFDM symbol has been rounded, which is why 6×71.36 μs+71.88 μs does not equal exactly 0.5 ms. In implementation, the durations are such that the sum of the durations equals 0.5 ms.

The length of an OFDM symbol, i.e. the OFDM symbol duration $t_s$, is related to the subcarrier spacing. The closer the subcarrier spacing, the longer the OFDM symbol duration $t_s$. FIG. 5 illustrates a table showing the OFDM symbol duration $t_s$, the CP length, the excess portion of the long CP compared to the regular CP, the number of symbols per subframe, the subframe length, and the CP overhead, for the following subcarrier spacings: 7.5 kHz, 15 kHz, 30 kHz, 60 kHz, 120 kHz, 240 kHz, and 480 kHz. Some of the numbers in the table are rounded. The different subcarrier spacings correspond to different numerologies. The row indicating the CP length gives, for each subcarrier spacing, the length of the long CP and the length of the regular CPs. For example, for 30 kHz subcarrier spacing, the long CP OFDM symbol is 0.26 μs longer than a regular CP OFDM symbol. As can be seen from FIG. 5, the numerologies are scalable in sub-carrier spacing, OFDM symbol duration, and CP length. For example, a 15 kHz subframe can fit four 60 kHz subframes.

In the example table in FIG. 5, a subframe is defined as seven OFDM symbols, regardless of the numerology. This is only an example. The number of symbols in a subframe may be different for different numerologies. Also, in some embodiments, the length of a subframe or TTU or scheduling interval may change dynamically or semi-statically over time for some or all numerologies.

Returning to FIG. 1, base station 104 uses three different numerologies: 15 kHz subcarrier spacing, 30 kHz subcarrier spacing, and 60 kHz subcarrier spacing. It may be desirable to have alignment between the different co-existing numerologies. The alignment may be subframe alignment or symbol alignment. Alignment across different numerologies may be complicated by the presence of long CP OFDM symbols. LTE has a long CP OFDM symbol at the start of each slot, as shown in FIG. 4. Different numerologies may also use scaled long CP OFDM symbols to be compatible with LTE subframes, or to be compatible with non-LTE subframes having a subcarrier spacing of 15 kHz, if the non-LTE subframes having a subcarrier spacing of 15 kHz include a long CP symbol to align with an LTE subframe.

In embodiments below, time-frequency allocation structures for different numerologies are disclosed that allow for alignment across the different numerologies. Some embodiments below are specifically in the context of a time division duplex (TDD) system. In a TDD system, both uplink communications and downlink communications share the same frequency band. Therefore, in a TDD system, the communications alternate over time between uplink and downlink, with a guard period (GP) used to provide a space in time between uplink and downlink communications. "Guard period" is used herein to mean a duration of time during which there is no typical uplink or downlink transmission. A guard period is sometimes instead referred to as a blank period.

However, even though the example embodiments below are in the context of a TDD system, in a unified duplex frame structure the alignment solutions presented herein may include frequency division duplex (FDD) frame structures as well. In an FDD system there is typically not the same issue of interference between uplink and downlink because uplink and downlink transmissions do not share the same frequency band. However, there may be future applications in which a unified frame structure is used for both TDD and FDD. When a unified frame structure is used and the system switches from FDD to TDD, then the system may continue to use same frame structure. Using a unified frame structure may avoid the system having to make sure that the frame structure has alignment whenever there is a switch from FDD to TDD.

Subframe Alignment

Subframe alignment occurs when there is boundary alignment between groups of OFDM symbols across different numerologies. There may not be symbol-by-symbol alignment across the different numerologies, but the start of one group of OFDM symbols in one numerology is aligned with the start of another group of OFDM symbols in another numerology. Example embodiments having subframe alignment are described below. Symbol alignment is discussed later.

Figure 6:
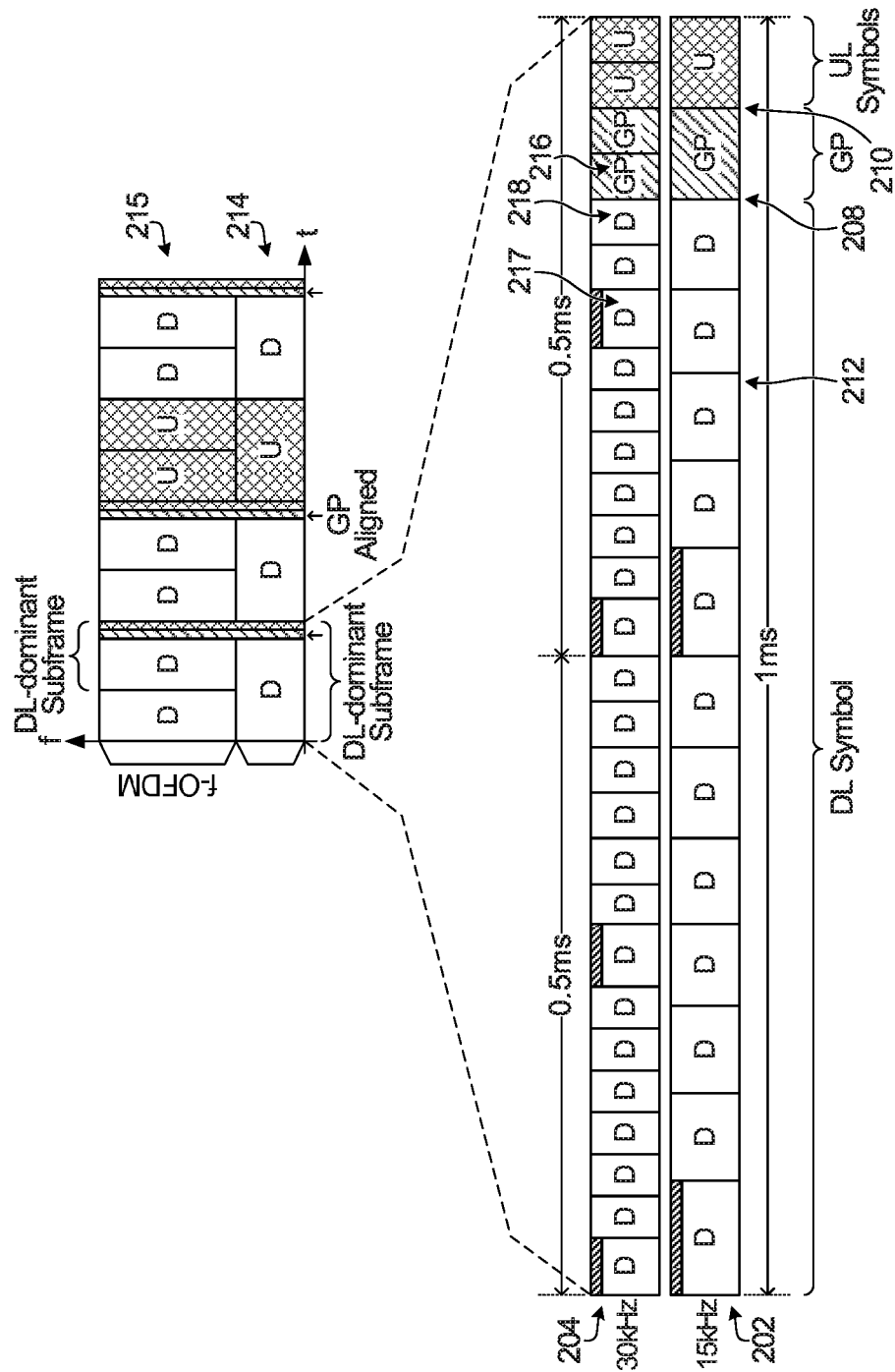
FIGS. 6 to 14 illustrate examples of time-frequency resources of different numerologies having subframe alignment.

FIG. 6 illustrates a 1 ms time interval of time-frequency resources having different numerologies. Time-frequency resources having a subcarrier spacing of 15 kHz are shown at 202, and time-frequency resources having a subcarrier spacing of 30 kHz are shown at 204. A long CP OFDM symbol is again shown by using hatching along the top of the OFDM symbol. The blocks labelled "D" or unlabelled are downlink OFDM symbols, and the blocks labelled "U" are uplink OFDM symbols. The blocks labelled "GP" are symbol durations used as a guard period during which there is no data transmission. The notation of FIG. 6 will also be used in subsequent figures.

A guard period is inserted whenever there is a transition from downlink to uplink or vice versa. In this embodiment, the 15 kHz numerology has a subframe every 1 ms, and the 30 kHz numerology has a subframe every 0.5 ms. The OFDM symbols of the 30 kHz numerology are scaled to half the length of the OFDM symbols of the 15 kHz numerology. Therefore, each subframe of the 15 kHz numerology is aligned in time with the start of a subframe of the 30 kHz numerology. The guard period and uplink OFDM symbols of both the 15 kHz numerology and the 30 kHz numerology are also symbol aligned, as shown at 208 and 210. The guard period and uplink symbols are symbol aligned because they occur later in time than the last long OFDM symbol 217 of the 30 kHz numerology that is within a subframe of the 15 kHz numerology, and so the guard period and uplink symbols are not affected by symbol misalignment. In the illustrated embodiment, the guard period and uplink symbols are at the end of a subframe of the 15 kHz numerology.

The subframe of the 15 kHz numerology shown at 202 is a "downlink dominated" subframe because it includes predominately downlink OFDM symbols. Similarly, the second subframe of the 30 kHz numerology shown at 204 is downlink dominated. As shown at 214, a 15 kHz numerology time-frequency allocation structure may be used that is a repeating pattern of: a first 15 kHz downlink dominated subframe, followed by a second 15 kHz downlink dominated subframe, followed by a 15 kHz uplink subframe. As shown at 215, the time-frequency allocation structure of the corresponding 30 kHz numerology may be a repeated pattern of: a 30 kHz downlink subframe, followed by a 30 kHz downlink dominated subframe, followed by a 30 kHz downlink subframe, followed by a 30 kHz downlink dominated subframe, followed by two 30 kHz uplink subframes.

In FIG. 6, there are both downlink and uplink OFDM symbols. A time interval during which there are both downlink and uplink OFDM symbols is referred to as a "self-contained TDD time interval". The time-frequency allocation structure in FIG. 6 may be referred to as having a self-contained TDD time interval of 1 ms.

Note that the number of OFDM symbol durations in FIG. 6 used as a guard period may change, depending upon the numerology. For example, in an alternative embodiment, the first portion of the guard period 216 in interval 204, which is equal in duration to a regular CP OFDM symbol, may instead be used to communicate data via a regular CP OFDM symbol. As another example, OFDM symbol 218 may instead be used as part of the guard period to have a guard period in the 30 kHz numerology equal to the duration of three regular CP OFDM symbols.

Figure 7:
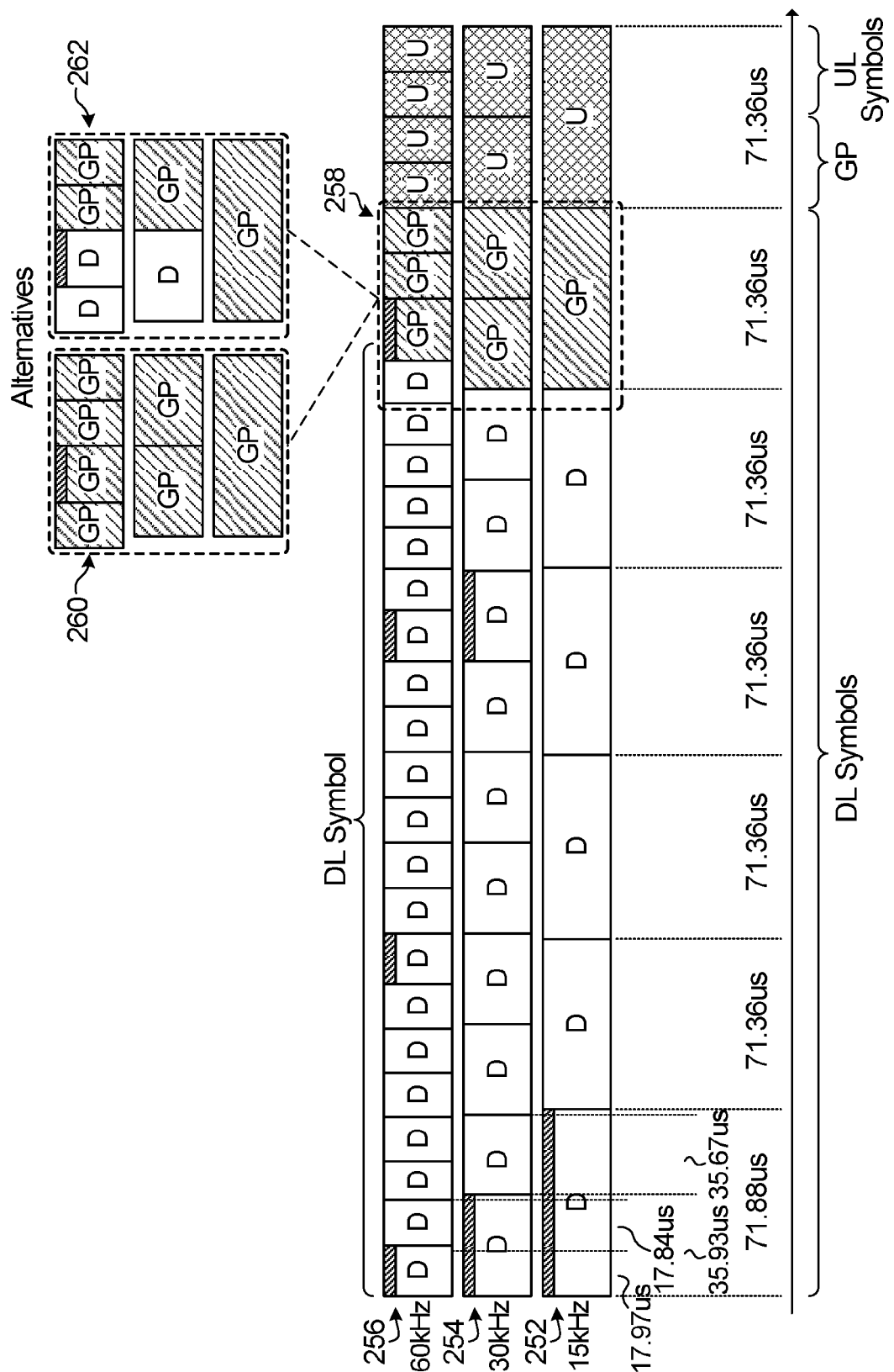

FIG. 7 illustrates a 0.5 ms time interval of time-frequency resources having different numerologies. Time-frequency resources having a subcarrier spacing of 15 kHz are shown at 252, the time-frequency resources having a subcarrier spacing of 30 kHz are shown at 254, and the time-frequency resources having a subcarrier spacing of 60 kHz are shown at 256. FIG. 7 represents a time-frequency allocation structure that has a self-contained TDD time interval of 0.5 ms. The uplink OFDM symbols are symbol aligned because they occur later in time than the last long OFDM symbol of the portion of the 60 kHz numerology that is within the 0.5 ms time interval of the illustrated 15 kHz numerology, and so the uplink symbols are not affected by the symbol misalignment. In the illustrated embodiment, the uplink symbols are at the end of the 0.5 ms time interval. Specifically, the last 71.36 μs of the 0.5 ms are used for the uplink. This means that there is one uplink OFDM symbol for the 15 kHz numerology in the 0.5 ms interval, there are two uplink OFDM symbols for the 30 kHz numerology in the 0.5 ms interval, and there are four uplink OFDM symbols for the 60 kHz numerology in the 0.5 ms interval. The guard period is configurable. Examples of possible guard periods are shown at 258, 260, and 262. Notably, the guard period of the 30 kHz numerology and/or 60 kHz numerology may be made smaller or larger.

Figure 8:
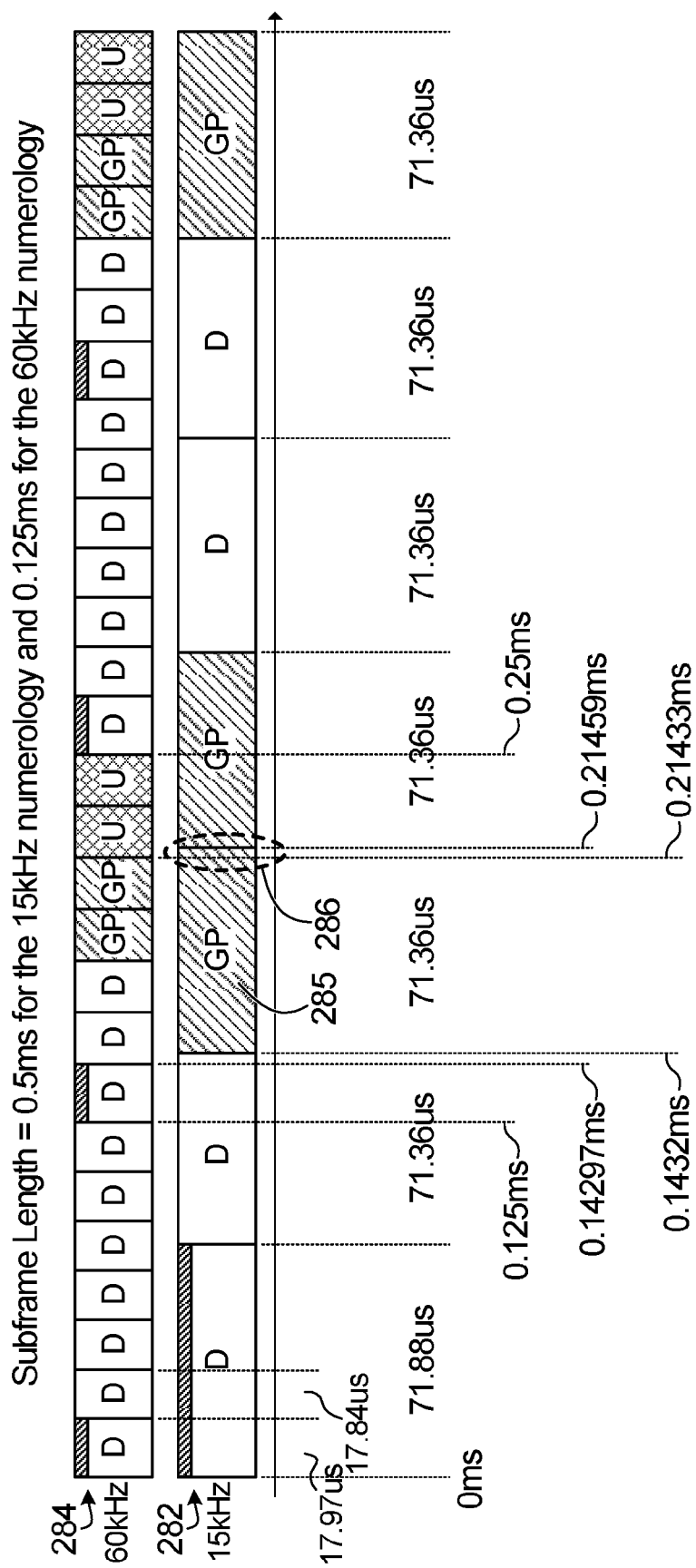

FIG. 8 illustrates a 0.5 ms time interval of time-frequency resources having different numerologies. Time-frequency resources having a subcarrier spacing of 15 kHz are shown at 282, and time-frequency resources having a subcarrier spacing of 60 kHz are shown at 284. In FIG. 8, the 60 kHz numerology has a self-contained TDD time interval of 14 OFDM symbols. A subframe for the 60 kHz numerology in this example is 7 OFDM symbols (0.125 ms) and the last two OFDM symbols of every other subframe of the 60 kHz numerology are uplink OFDM symbols. The rest are used for downlink OFDM symbols and a guard period. A subframe for the 15 kHz numerology is 0.5 ms, and the illustrated subframe for the 15 kHz numerology is for downlink transmission only. Whenever an OFDM symbol of the 15 kHz numerology overlaps in time with an uplink OFDM symbol in the 60 kHz numerology, the overlapping OFDM symbol of the 15 kHz numerology is set as a guard period instead in order to mitigate interference with the uplink transmission in the 60 kHz numerology. Only four of the seven possible OFDM symbols in the illustrated 15 kHz subframe are used for data transmission. However, note that due to symbol misalignment, the third OFDM symbol 285 in the 15 kHz subframe only has a small overlap 286 with an uplink OFDM symbol in a 60 kHz subframe. Therefore, in alternative embodiments, the third OFDM symbol 285 in the 15 kHz subframe may be used to transmit data, with the understanding that there may be some interference with the uplink transmission in the 60 kHz subframe.

In a variation of the embodiment in FIG. 8, there may only be one uplink OFDM symbol, instead of two uplink OFDM symbols, at the end of every other subframe of the 60 kHz numerology. There may also or instead only be a guard period equal in duration to one regular CP OFDM symbol, instead of two, preceding two or three uplink OFDM symbols in every other subframe of the 60 kHz numerology.

Figure 9:
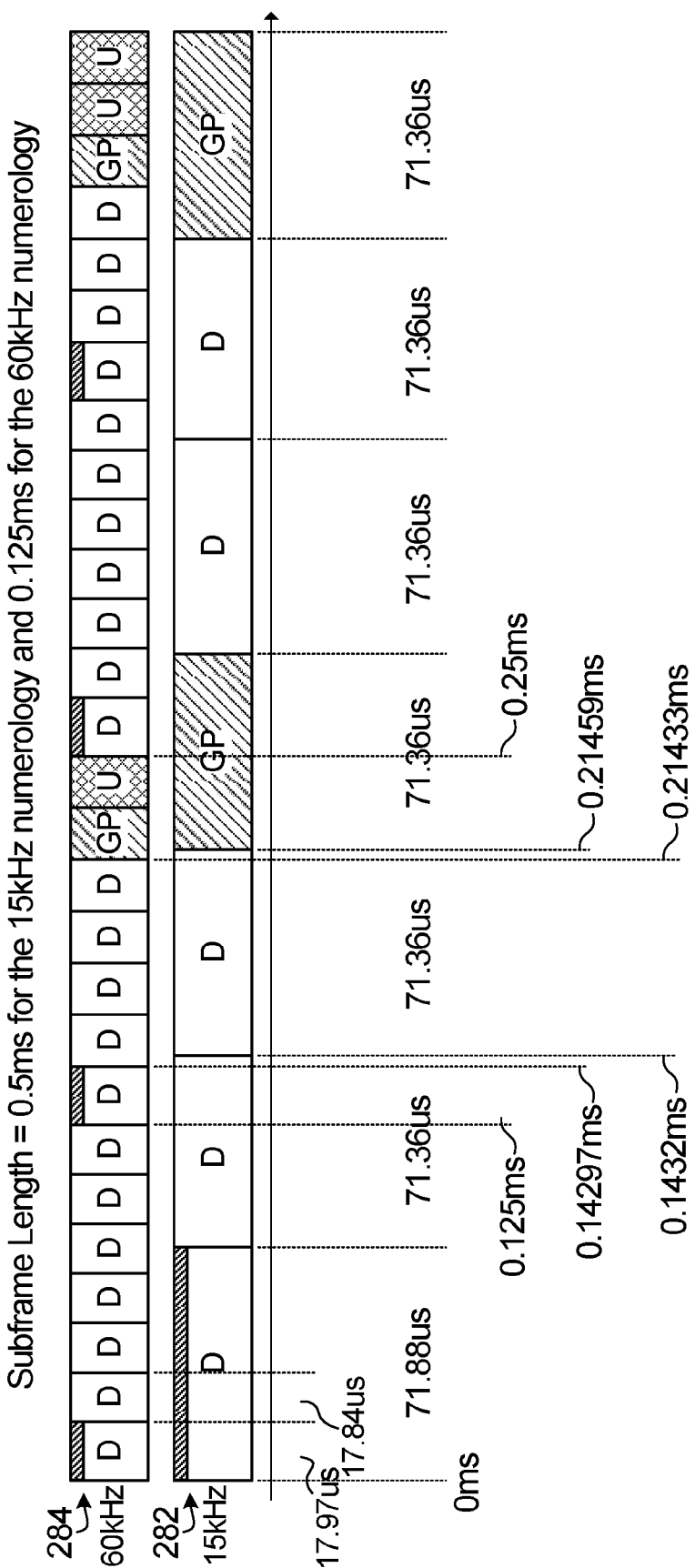

FIG. 9 illustrates a variation of FIG. 8 in which there is one uplink OFDM symbol, preceded by a guard period equal to the duration of one regular CP OFDM symbol, in the second illustrated subframe of the 60 kHz numerology. In the fourth illustrated subframe of the 60 kHz numerology, there are still two uplink OFDM symbols, but preceded by a guard period equal to the duration of only one regular CP OFDM symbol. In the embodiment of FIG. 9, five of the possible seven OFDM symbols in the illustrated subframe of the 15 kHz numerology may be used for downlink transmission. The other two OFDM symbols in the illustrated subframe of the 15 kHz numerology are set as guard periods to mitigate interference with the uplink transmissions in the 60 kHz numerology.

Figure 10:
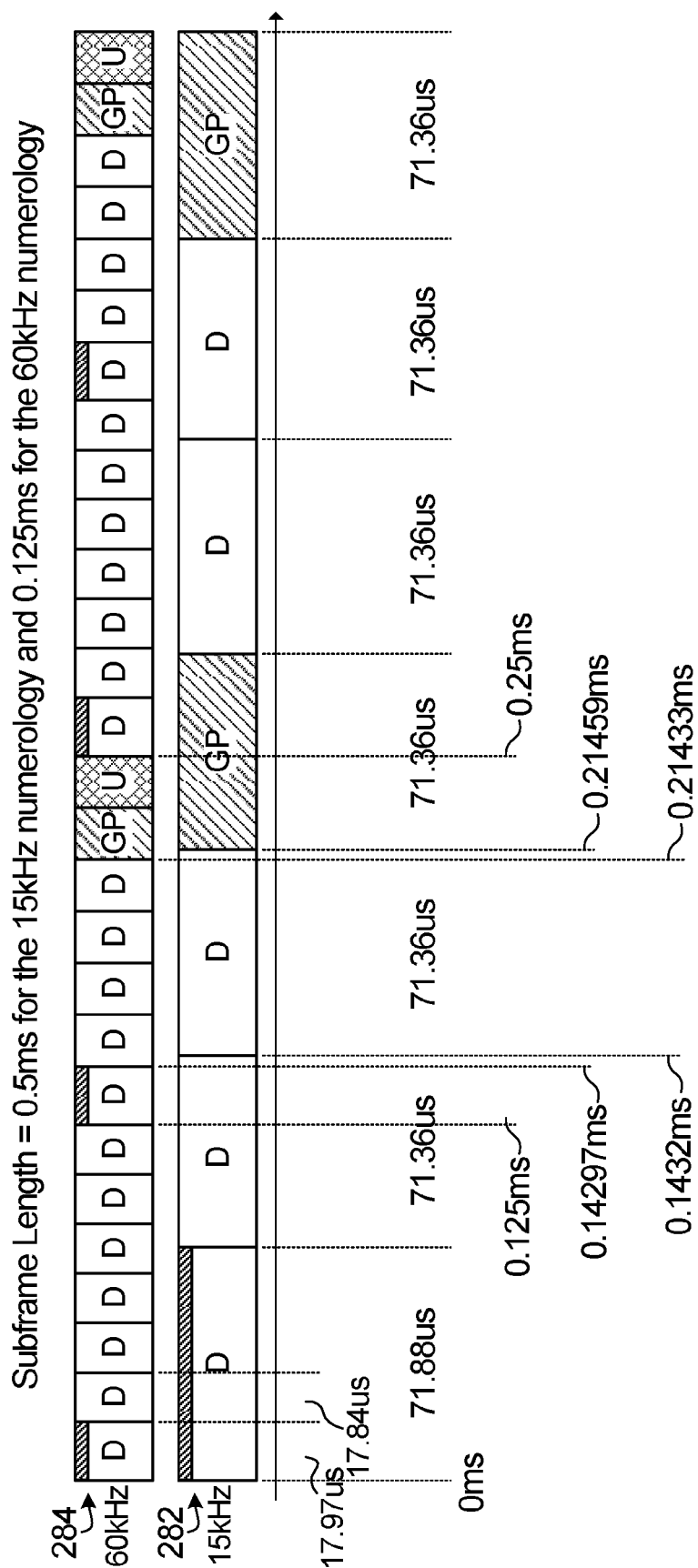

FIG. 10 illustrates a variation of FIG. 8 in which there is one uplink OFDM symbol, preceded by a guard period equal to the duration of one OFDM symbol, in every other subframe of the 60 kHz numerology. In this embodiment, five of the possible seven OFDM symbols in the illustrated subframe of the 15 kHz numerology may be used for downlink transmission. The other two OFDM symbols in the illustrated subframe of the 15 kHz numerology are set as guard periods to mitigate interference with the uplink transmissions in the 60 kHz numerology.

Figure 11:
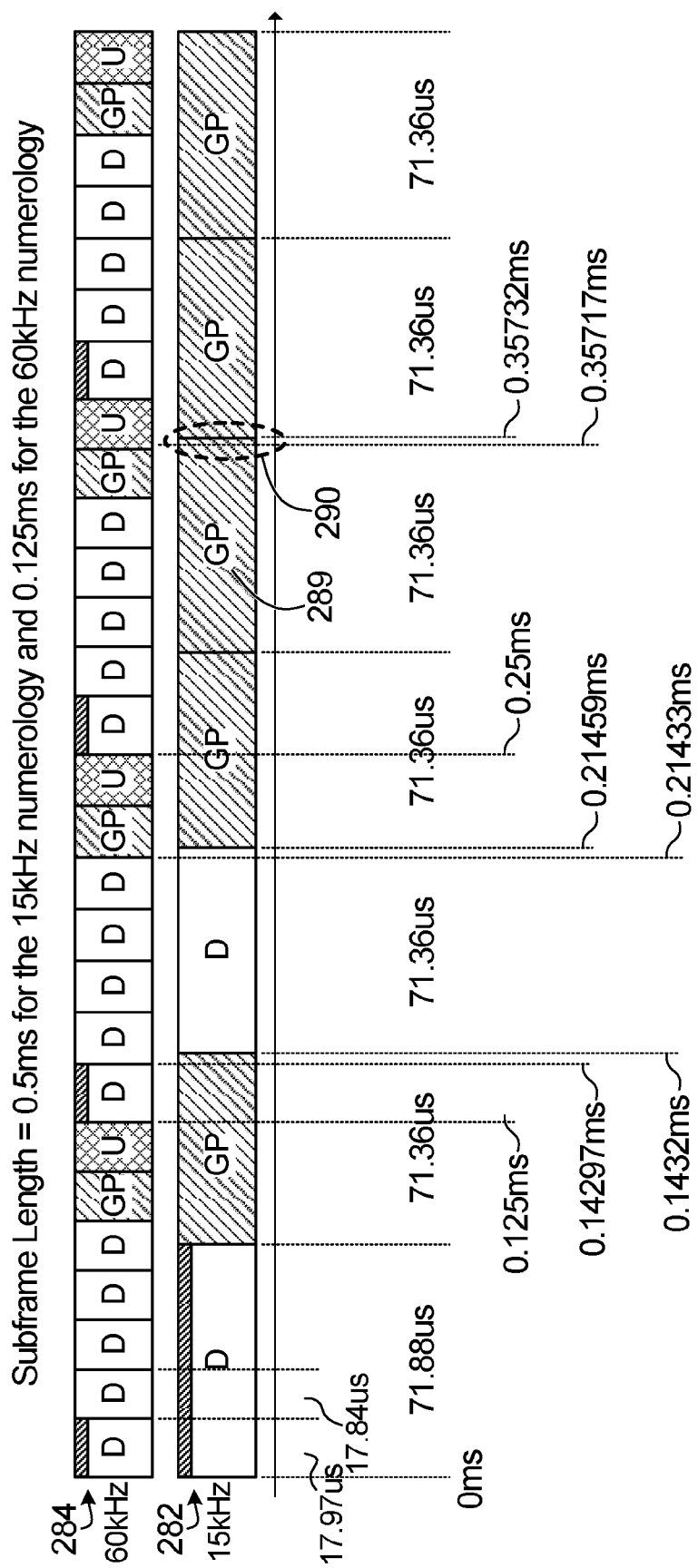

FIG. 11 illustrates a variation in which the 60 kHz numerology has a self-contained TDD time interval of 7 OFDM symbols (0.125 ms). There is one uplink regular CP OFDM symbol, preceded by a guard period equal to the duration of one regular CP OFDM symbol, prior to each long CP OFDM symbol of the 60 kHz numerology. This embodiment has a possible drawback in that five of the seven available OFDM symbols in the illustrated subframe of the 15 kHz numerology are set as guard periods to mitigate interference with the uplink transmissions in the 60 kHz numerology. The fifth OFDM symbol of the illustrated subframe of the 15 kHz numerology is shown at 289. Although this symbol 289 is shown as a guard period, it only has a small overlap 290 with an uplink symbol in the 60 kHz numerology, and therefore it may be possible to instead transmit data in the downlink using the OFDM symbol 289 with some interference. FIG. 11 illustrates the principle that the more frequent the self-contained TDD time interval of a higher numerology, the higher the number of OFDM symbols in a lower numerology that may need to be set as guard periods.

Figure 12:
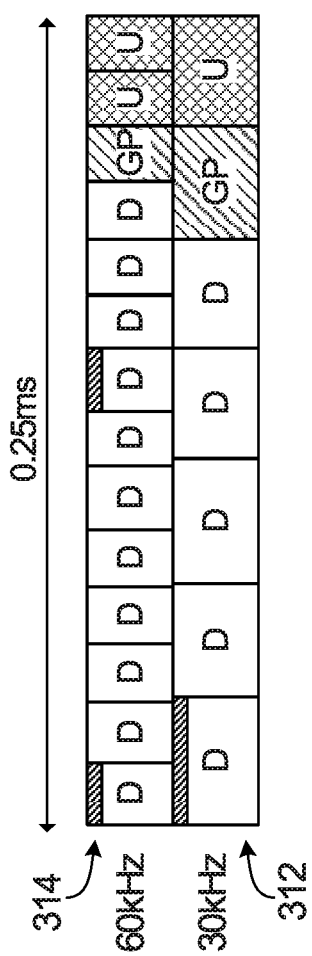
Figure 13:
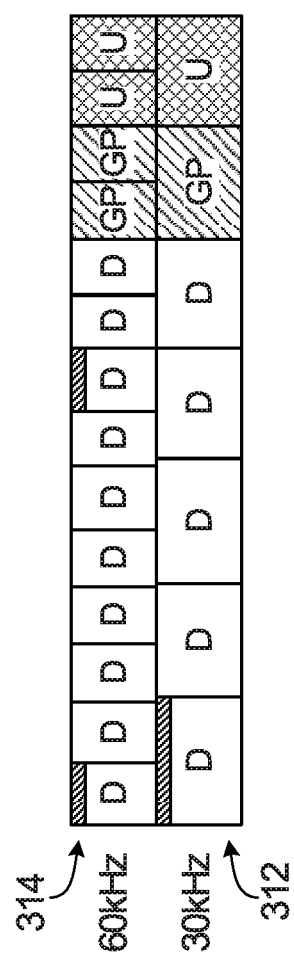
Figure 14:
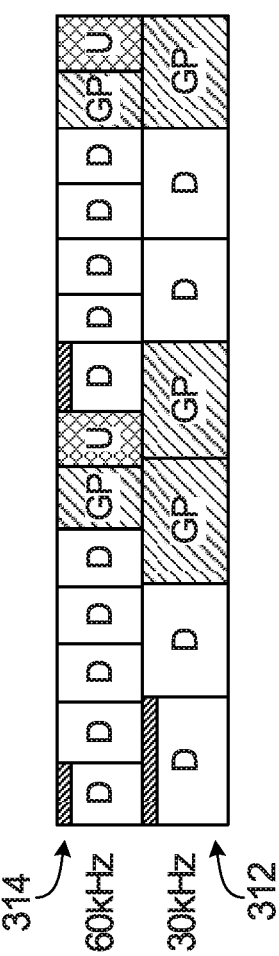

FIGS. 12 to 14 each illustrate a 0.25 ms time interval of time-frequency resources having different numerologies. Time-frequency resources having a subcarrier spacing of 30 kHz are shown at 312, and time-frequency resources having a subcarrier spacing of 60 kHz are shown at 314. Both the 30 kHz numerology and the 60 kHz numerology in FIGS. 12 and 13 have a self-contained TDD time interval of 0.25 ms. FIG. 14 has a self-contained TDD time interval of 0.125 ms for the 60 kHz numerology only. In FIG. 14, whenever an OFDM symbol of the 30 kHz numerology overlaps in time with an uplink OFDM symbol in the 60 kHz numerology, the overlapping OFDM symbol of the 30 kHz numerology is set as a guard period.

Symbol Alignment

Symbol alignment means that each symbol of the sub-frame corresponding to the lowest sub-carrier spacing aligns with an integer number of symbols of the sub-frame of larger sub-carrier spacing. How many symbols of a larger sub-carrier spacing would align with a symbol of the lower sub-carrier spacing is given by the scaling relationship between the sub-carrier spacings. Symbol alignment applies to both long CP OFDM symbols and regular CP OFDM symbols, and symbol alignment permits subframe alignment, if sub-frames of different numerologies start at the same time in a TDD frame structure.

There are some scenarios, such as low latency applications, in which symbol alignment may be desirable. When there is symbol alignment, then it may be easier to have a TTU of any duration for any numerology. Also, when there is symbol alignment, then it may be easier to allow for the TTU for each numerology to vary over time. Also, when there is symbol alignment, it may be possible to employ self-decodable OFDM symbols, rather than encoding/decoding over a full TTU.

For a frequency spacing $f_s=f_0\times 2^n$, where $f_0$ is a reference frequency and $f_0=15$ kHz, then $2^n$ OFDM symbols align with one 15 kHz OFDM symbol. For example, when n=1, then the frequency spacing is $f_s=30$ kHz, and $2^1=2$ OFDM symbols of a 30 kHz numerology align with one OFDM symbol of a 15 kHz numerology. However, symbol alignment may be complicated by the presence of the long CP OFDM symbol. Due to the presence of the long CP OFDM symbol, not all symbols of one numerology will necessarily be aligned with symbols of another numerology. For example, referring back to FIG. 6, although there is subframe alignment, there is not always symbol alignment between different numerologies, as shown at 212.

However, example embodiments having symbol alignment are described below. Moreover, potentially efficient utilization of long CP OFDM symbols, or the extra potion of long CP OFDM symbols, is possible in a TDD framework by re-ordering long and regular CP OFDM symbols.

Figure 15:
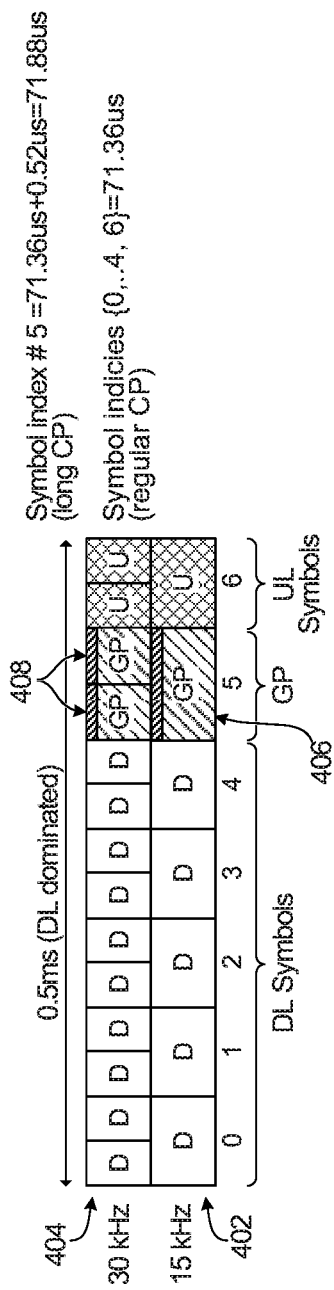
FIGS. 15 to 31 illustrate examples of time-frequency resources of different numerologies having symbol alignment.
Figure 16:
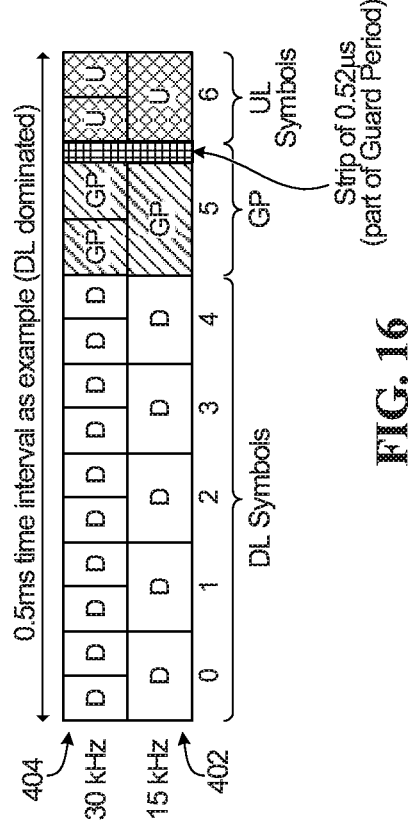

FIGS. 15 and 16 each illustrate a 0.5 ms time interval of time-frequency resources having different numerologies. Time-frequency resources having a subcarrier spacing of 15 kHz are shown at 402, and time-frequency resources having a subcarrier spacing of 30 kHz are shown at 404. Both the 15 kHz numerology and the 30 kHz numerology have a self-contained TDD time interval of 0.5 ms. In the example shown in FIG. 15, the single long CP OFDM symbol 406 in the 15 kHz numerology is instead located immediately before the uplink OFDM symbol and replaced with a guard period. That is, a guard period equal to a single long CP OFDM symbol in the 15 kHz numerology is present at symbol index #5, rather than having a single long CP OFDM symbol at index #0. Index #0 instead includes a regular CP OFDM symbol. Additionally, the two long CP OFDM symbols 408 in the 30 kHz numerology are located immediately before an uplink OFDM symbol and replaced with a guard period. All of the other OFDM symbols are regular CP OFDM symbols. By moving the long CP OFDM symbols in the 30 kHz numerology adjacent each other and at the same location as the single long CP OFDM symbol in the 15 kHz numerology, symbol alignment can be achieved. Moreover, by placing the long CP OFDM symbols immediately before the UL OFDM symbols, the long CP OFDM symbols can be replaced with a guard period. The long CP OFDM symbol durations are therefore used to provide a guard period that is 0.52 µs longer than using a guard period equal in duration to a regular CP OFDM symbol. Having a longer guard period may provide more robust timing advance depending upon the cell size. By having a longer guard period, there is more time available for timing advance for the UEs to begin their uplink transmissions prior to the start of the uplink period. If a UE is far away from the base station, e.g. due to a large cell, then a longer timing advance may be needed for that UE. Having the longer guard period may better accommodate longer timing advances. Also, the overhead of having a long CP in data transmission may be mitigated by using the long CP as part of the guard period.

In the example shown in FIG. 16, no long CP OFDM symbols are used. However, to be compatible with an LTE system, which uses long CP OFDM symbols, a portion of time equal to 0.52 µs, which is the extra length of the long CP compared to the regular CP for 15 kHZ, is inserted before the uplink OFDM symbols, either right before the uplink OFDM symbols (as illustrated), or immediately after the downlink OFDM symbols. The 0.52 µs duration of time is used as part of the guard period. The OFDM symbol in the 15 kHz numerology that is immediately prior to the uplink OFDM symbol is replaced with a guard period. Similarly, the two OFDM symbols in the 30 kHz numerology that are immediately prior to the uplink OFDM symbols are also replaced with a guard period.

Although FIGS. 15 and 16 show a guard period in the 30 kHz numerology encompassing two OFDM symbols, instead a guard period may be used that encompasses only one OFDM symbol or more than two OFDM symbols. In general, the number of uplink OFDM symbols, as well as the number of OFDM symbols used as the guard period, may be changed.

Figure 17:
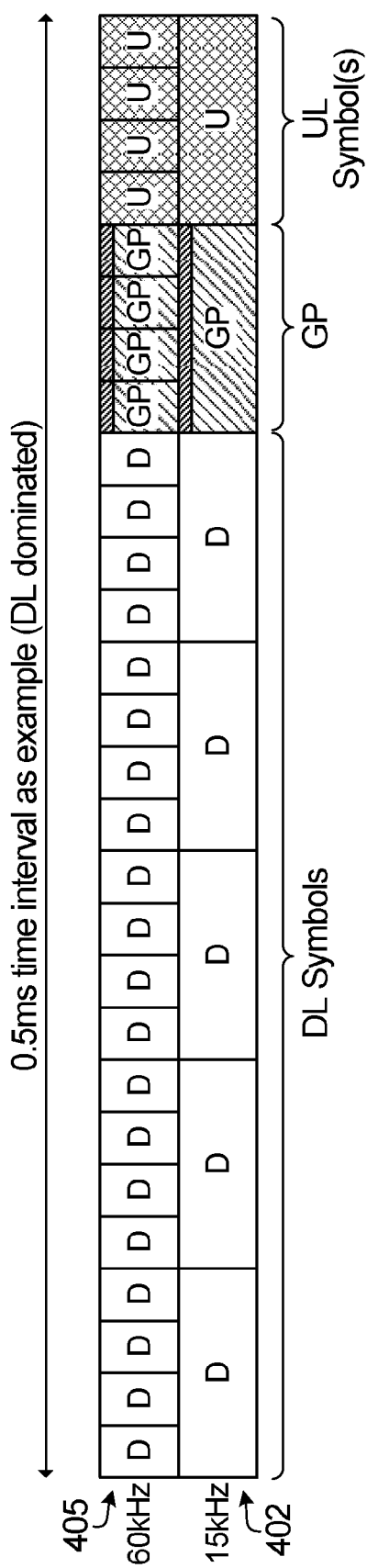
Figure 18:
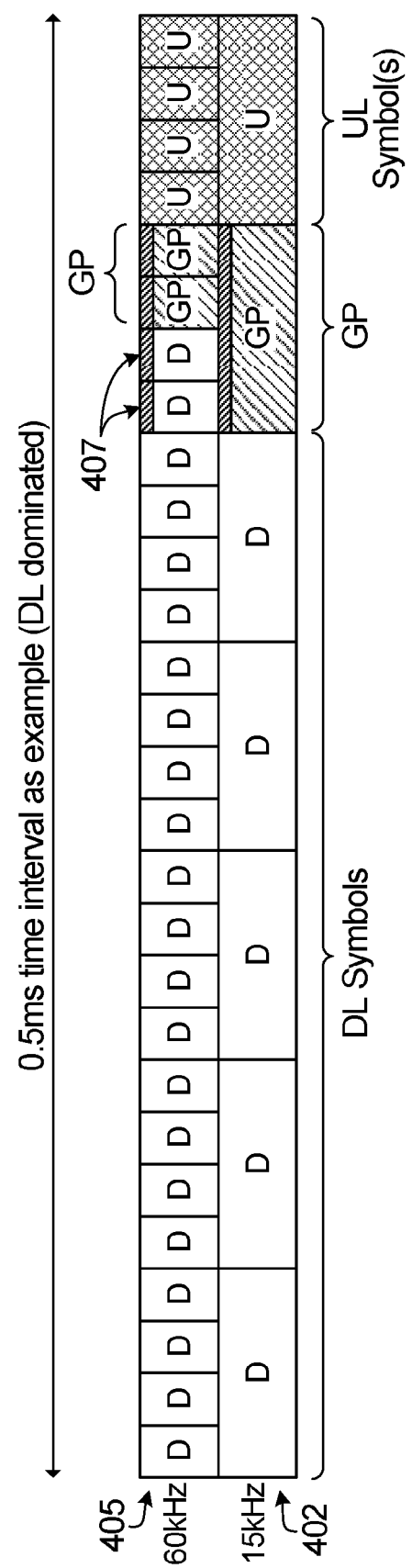

FIG. 17 corresponds to FIG. 15, but for the case in which the 30 kHz numerology is replaced with a 60 kHz numerology. The time-frequency resources corresponding to the 60 kHz numerology is shown at 405. FIG. 18 is a variation of FIG. 17 in which only two long CP OFDM symbols are used in the 60 kHz numerology as a guard period prior to the uplink OFDM symbols. The other two long CP OFDM symbols, shown at 407, are used to transmit data in the downlink.

Figure 19:
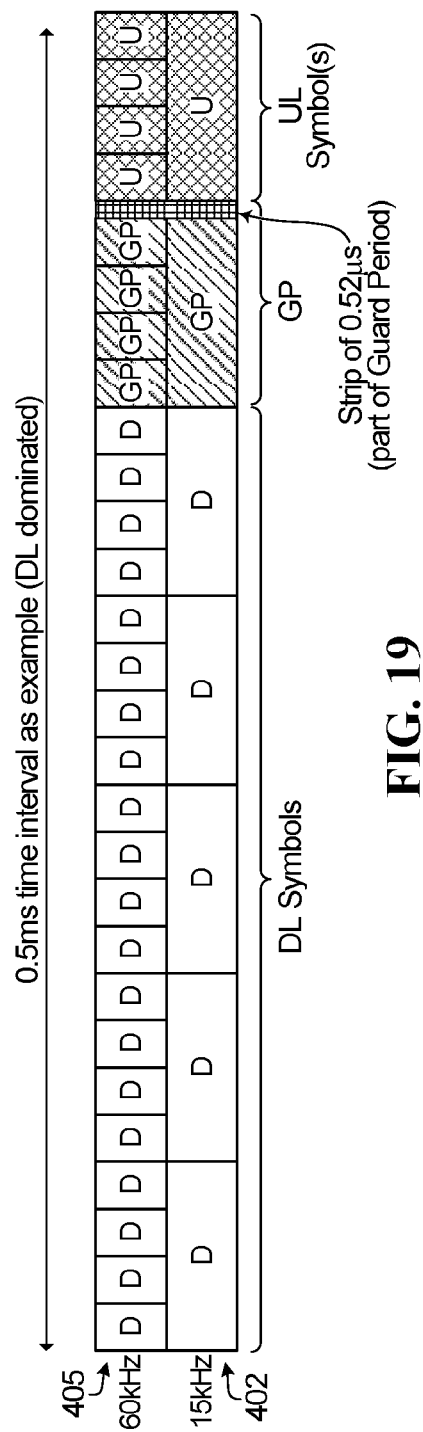
Figure 20:
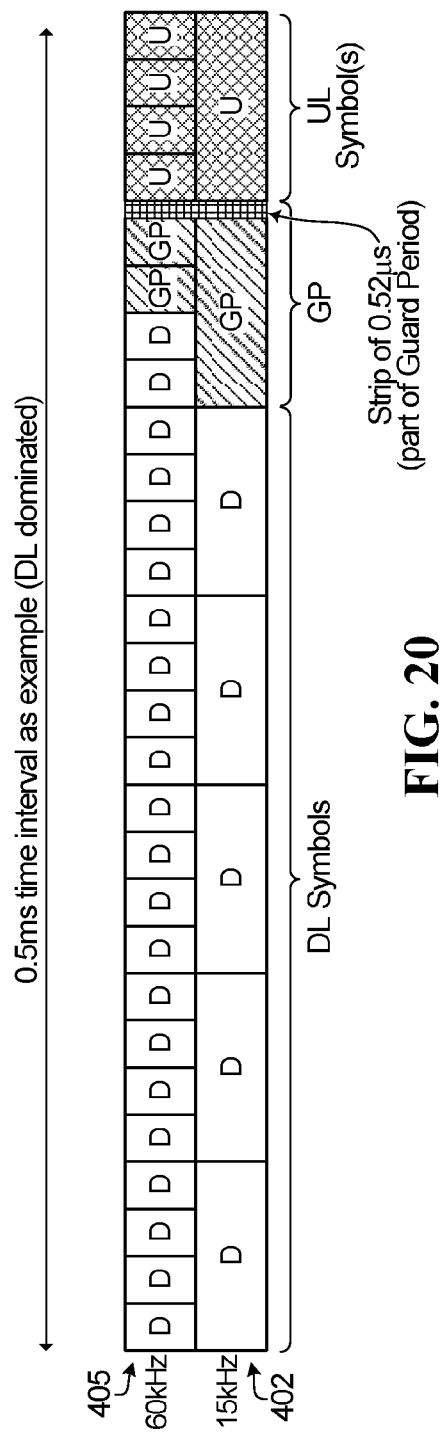

FIG. 19 corresponds to FIG. 16, but for the case in which the 30 kHz numerology is replaced with a 60 kHz numerology. The time-frequency resources corresponding to the 60 kHz numerology is shown at 405. FIG. 20 is a variation of FIG. 19 in which the guard period in the 60 kHz numerology encompasses only two regular CP OFDM symbols.

Figure 21:
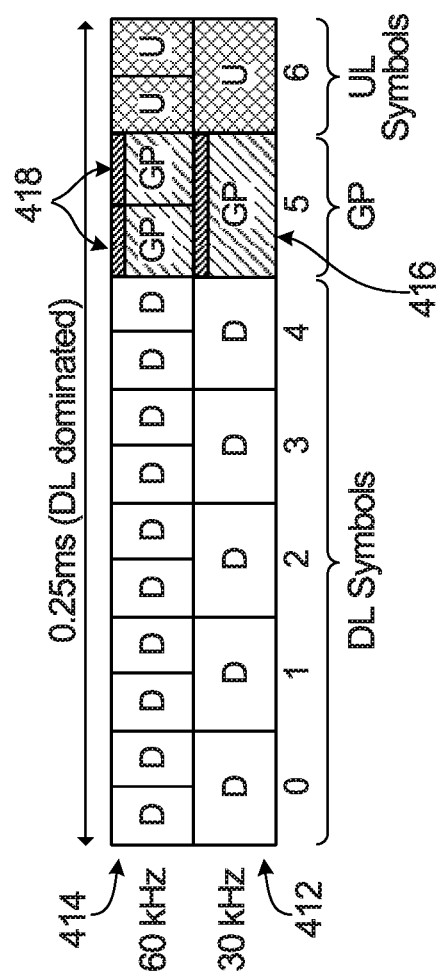
Figure 22:
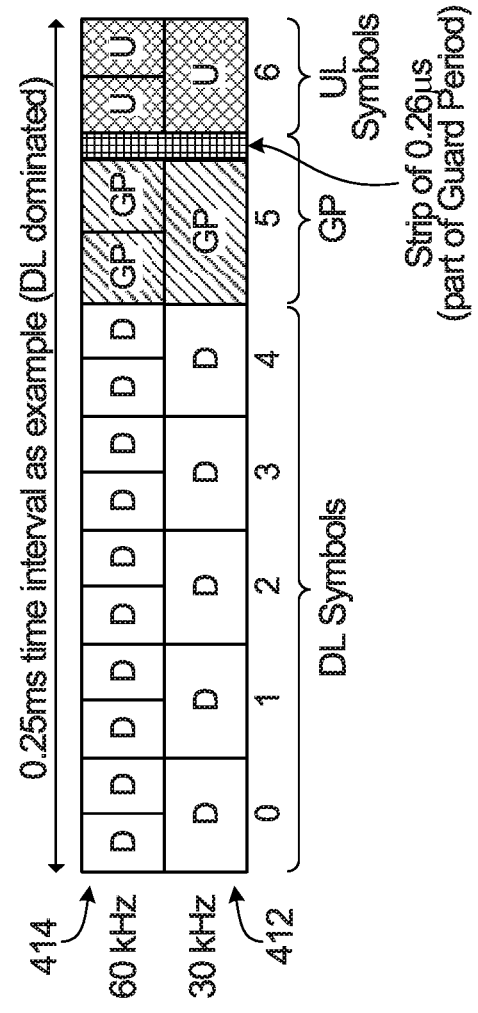

FIGS. 21 and 22 respectively correspond to FIGS. 15 and 16, but for the case in which 30 kHz is chosen to be the reference numerology. FIGS. 21 and 22 each illustrate a 0.25 ms time interval of symbol-aligned time-frequency resources having different numerologies. Time-frequency resources having a subcarrier spacing of 30 kHz are shown at 412, and time-frequency resources having a subcarrier spacing of 60 kHz are shown at 414. Both the 30 kHz numerology and the 60 kHz numerology have a self-contained TDD time interval of 0.25 ms. In the example shown in FIG. 21, the single long OFDM symbol 416 in the 30 kHz numerology is placed immediately before the uplink OFDM symbol, i.e. at symbol index #5, rather than symbol index #0, and is replaced with a guard period. Symbol index #0 instead includes a regular CP OFDM symbol. Similarly, the two long CP OFDM symbols 418 in the 60 kHz numerology are located immediately before an uplink OFDM symbol and replaced with a guard period.

In FIG. 22, no long CP OFDM symbols are used. However, a portion of time equal to 0.26 µs, which is the extra length of the long CP compared to the regular CP for 30 kHz, is inserted before the uplink OFDM symbols, either right before the uplink OFDM symbols as illustrated, or immediately after the downlink OFDM symbols. The 0.26 µs duration of time is used as part of the guard period. The OFDM symbol in the 30 kHz numerology that is immediately prior to the uplink OFDM symbol is replaced with a guard period. Similarly, the two OFDM symbols in the 60 kHz numerology that are immediately prior to the uplink OFDM symbols are also replaced with a guard period.

Figure 23:
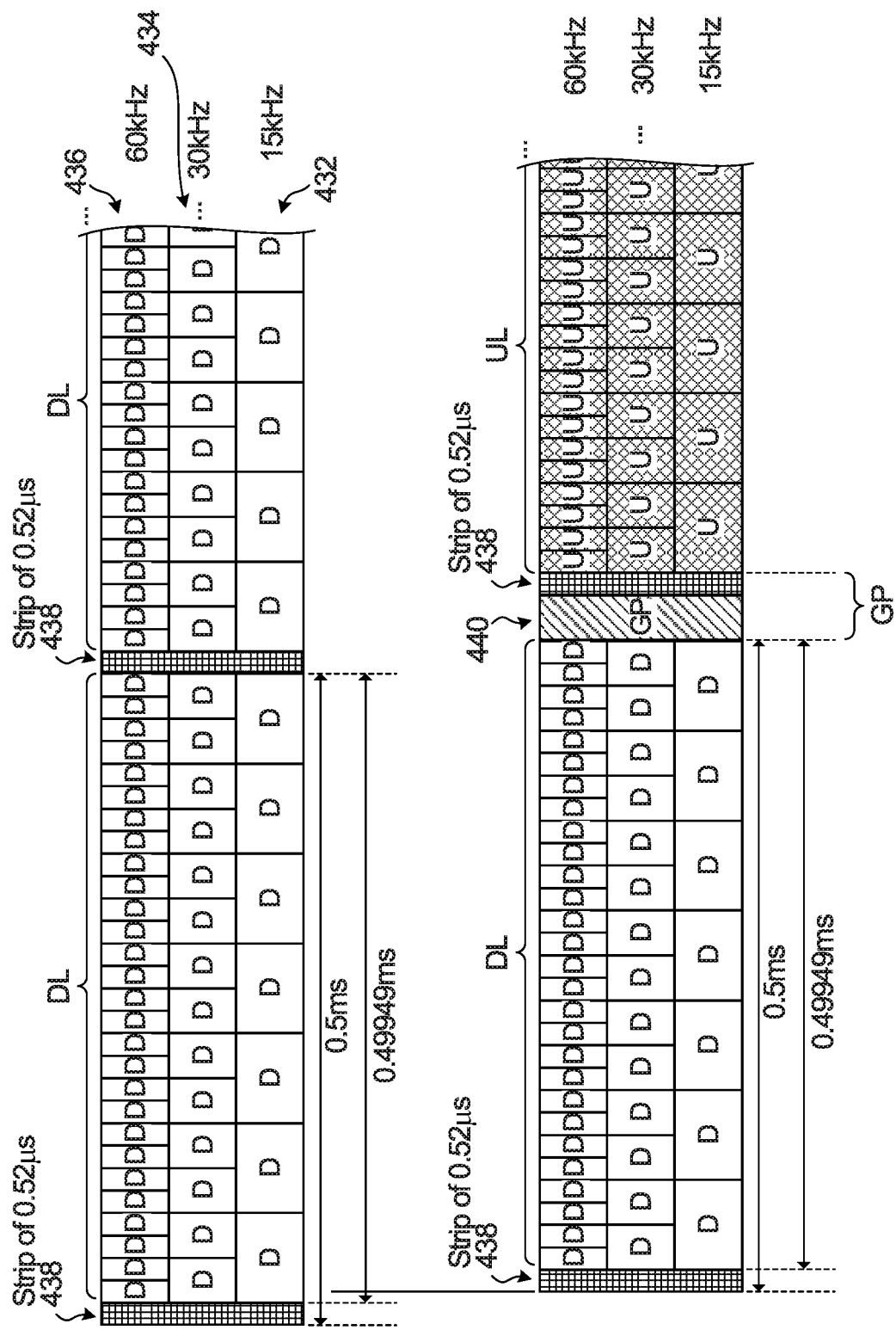

FIG. 23 illustrates 0.5 ms subframes of OFDM symbols having different numerologies. Time-frequency resources having a subcarrier spacing of 15 kHz are shown at 432, time-frequency resources having a subcarrier spacing of 30 kHz are shown at 434, and time-frequency resources having a subcarrier spacing of 60 kHz are shown at 436. Each subframe uses only regular CP OFDM symbols, and so there is symbol alignment. However, to be compatible with an LTE system, which uses long CP OFDM symbols, a portion of time equal to 0.52 µs, which is the extra length of the long CP compared to the regular CP for 15 kHz subcarrier spacing, is inserted at the start of each subframe, as shown at 438. In one embodiment, no data transmission occurs during this time period. However in other embodiments, e.g. in some FDD embodiments, data transmission may occur during the 0.52 µs portion. The 0.52 µs portion is equivalent to $16T_S$, where $T_S$ is the sampling time and $T_S$=FFT size/OFDM symbol duration. From FIG. 5, set 2, 66.66667 µs is the symbol duration for 15 kHz for 2048 point FFT size. In time, a sample occurs as often as $T_S$ µs, where 0.52 µs equals $16T_S$. The $16T_S$ comes at the beginning and may be used as part of the CP of the first symbol.

Alternatively, the portion of time equal to 0.52 µs may instead be inserted at the end of each subframe. When there is a transition from a downlink subframe to an uplink subframe, or vice versa, as shown at 440, a guard period is necessary. The 0.52 µs is included as part of the guard period. Therefore, instead of the 0.52 µs time duration acting as overhead, it may be included as part of the necessary guard period between uplink and downlink OFDM symbols. Note that the time interval is scalable with respect to 0.49949 ms, not 0.5 ms. When seven 15 kHz OFDM symbols is defined as a subframe duration, then the 15 kHz, 30 kHz and 60 kHz numerology will have scalable subframe duration of 0.49949 ms, 0.49949/2 ms, 0.44949/4 ms respectively.

In all of the embodiments described with respect to FIGS. 6 to 23, some or all of the following numerologies have been used: 15 kHz, 30 kHz, and 60 kHz subcarrier spacing. However, all of these embodiments can be modified to use other numerologies in a straightforward manner. For completeness, some examples involving 7.5 kHz subcarrier spacing are illustrated in FIGS. 24 to 27. Specifically, FIGS. 24 to 27 respectively correspond to FIGS. 17 to 20, but with 7.5 kHz and 30 kHz numerologies.

Figure 24:
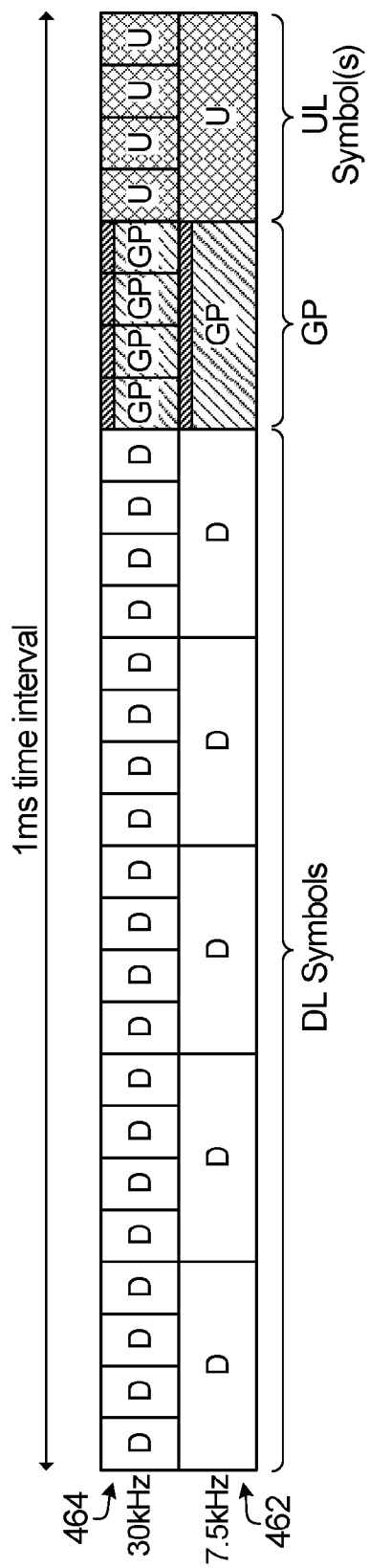
Figure 25:
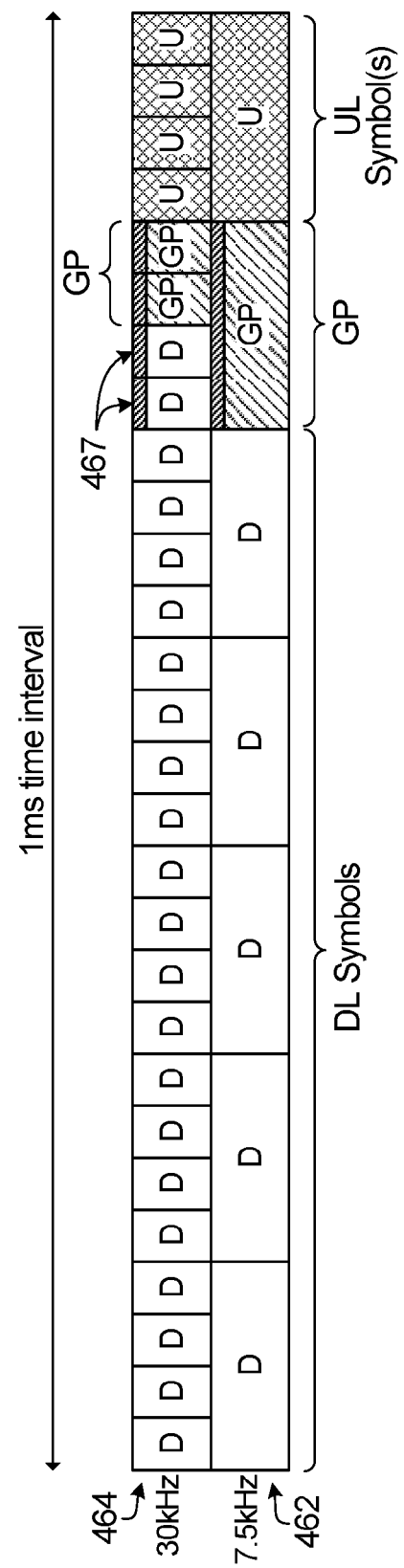

In FIG. 24, the time-frequency resources corresponding to the 7.5 kHz numerology is shown at 462, and the time-frequency resources corresponding to the 30 kHz numerology is shown at 464. FIG. 25 is a variation of FIG. 24 in which only two long CP OFDM symbols are used in the 30 kHz numerology as a guard period prior to the uplink OFDM symbols. The other two long CP OFDM symbols, shown at 467, are used to transmit data in the downlink.

Figure 26:
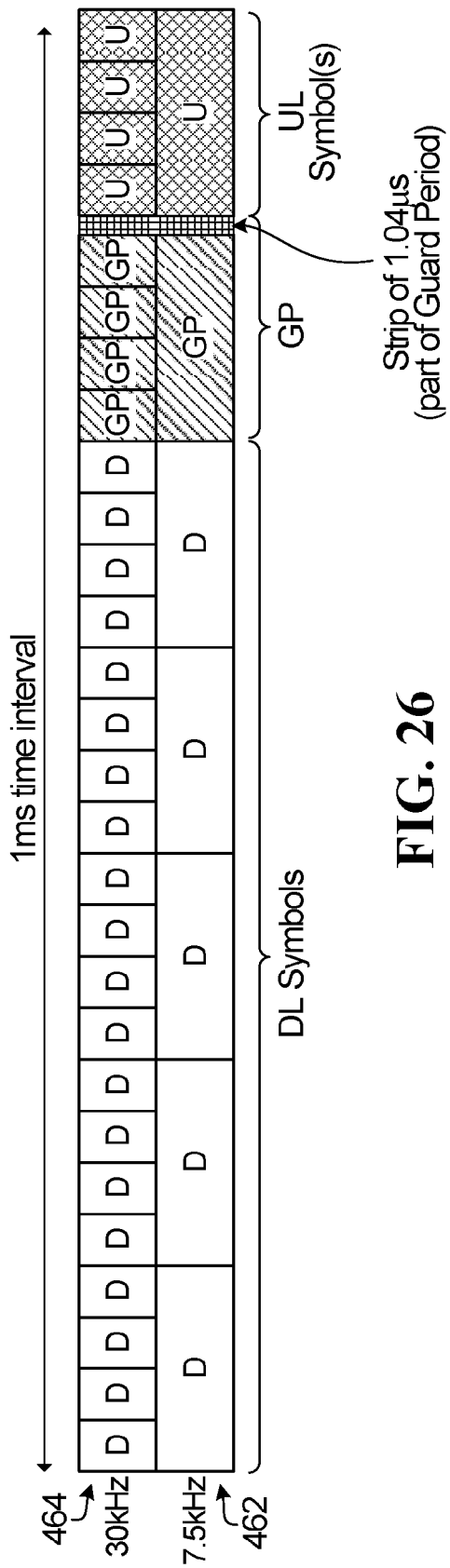
Figure 27:
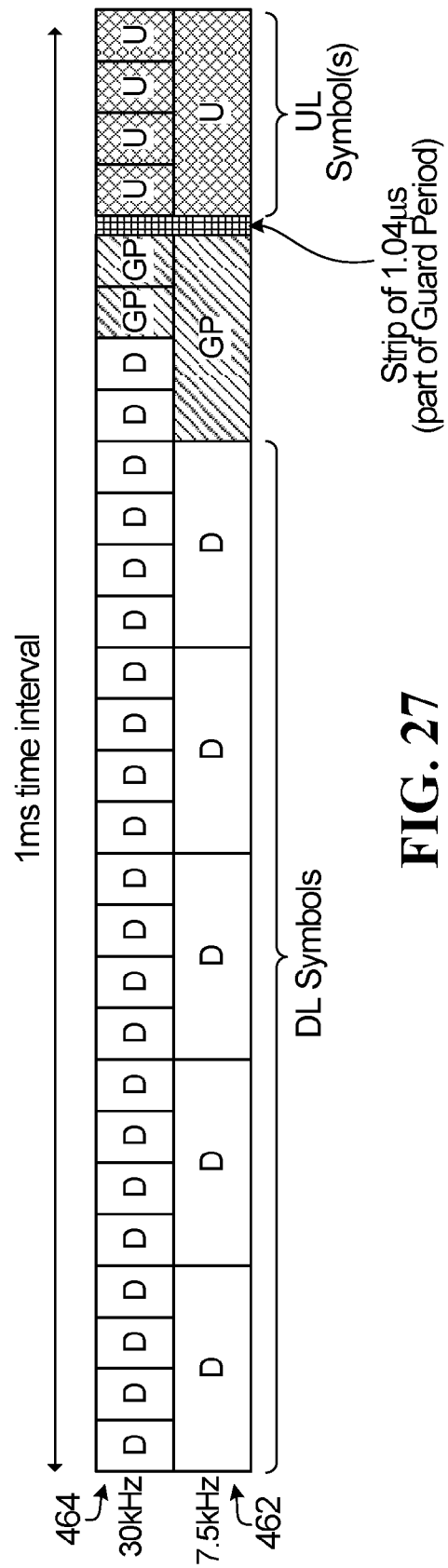

In FIG. 26, again the time-frequency resources corresponding to the 7.5 kHz numerology is shown at 462, and the time-frequency resources corresponding to the 30 kHz numerology is shown at 464. FIG. 27 is a variation of FIG. 26 in which the guard period in the 30 kHz numerology encompasses only two regular CP OFDM symbols. Using 7.5 kHz as the reference numerology results in scaling of the excess CP. For example, as shown in FIGS. 26 and 27, a strip of 1.04 µs is used as part of the guard period, compared to a strip of 0.52 µs in FIGS. 19 and 20. 1.04 µs is equal to the excess duration of a long CP compared to a regular CP for 7.5 kHz subcarrier spacing.

In all of the embodiments described with respect to FIGS. 6 to 27, downlink dominated subframes have been illustrated. The same discussion also applies to uplink dominated subframes. For example, all of FIGS. 6 to 27 may be modified to replace every uplink OFDM symbol with a downlink OFDM symbol and vice versa.

Figure 28:
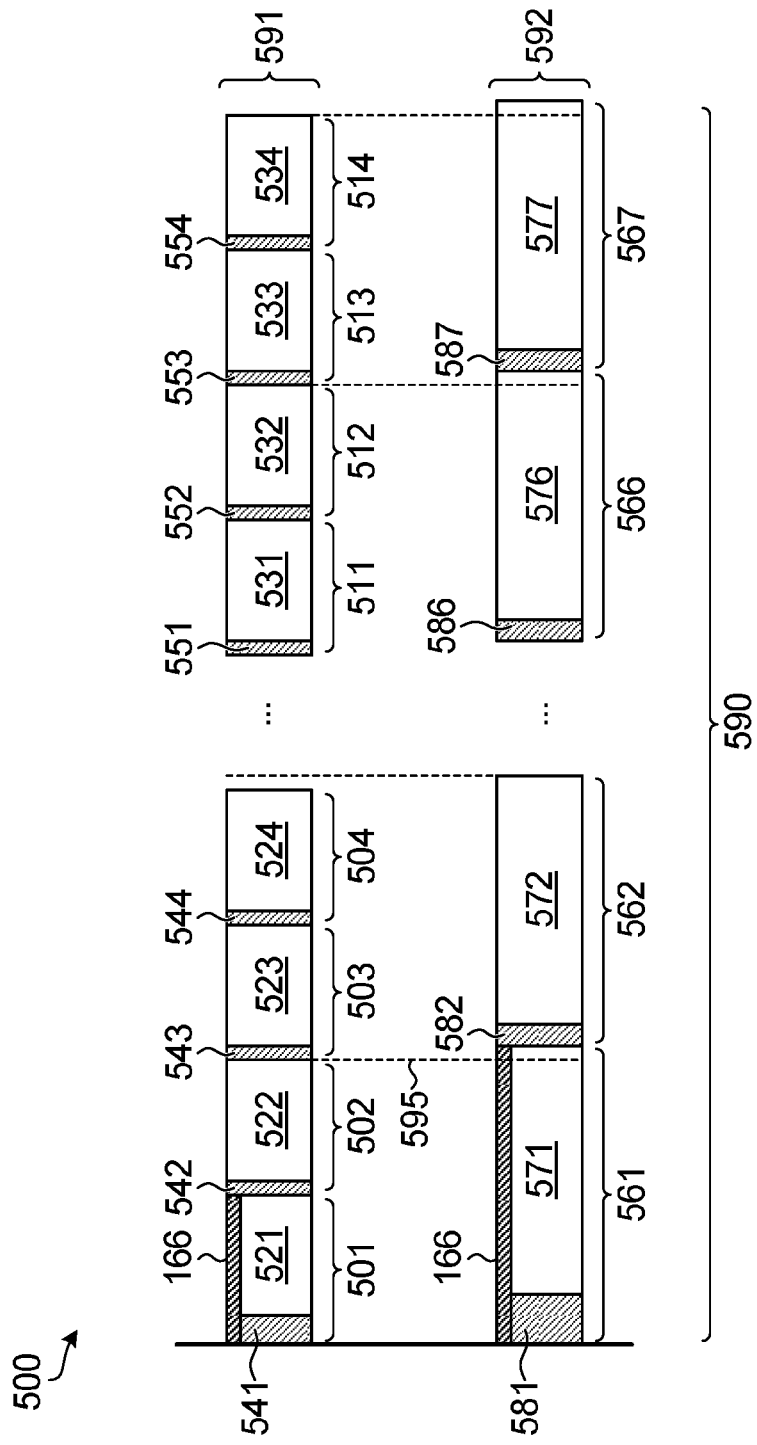

FIG. 28 describes symbol misalignment more generally. In the following description of FIG. 28 and some of the remaining figures, the terms "useful symbol duration" and "total symbol duration" are used. Useful symbol duration refers to the duration of an OFDM symbol minus the duration of the CP. Total symbol duration is the summation of the useful symbol duration and the CP duration.

FIG. 28 illustrates a frame structure 500 that carries misaligned symbols over sets of subcarrier frequencies that have different subcarrier spacings. The frame structure 500 may comprise one or more subfames.

A sequence of OFDM symbols 501-514 is transmitted over a set of subcarriers 591 in a frame 590. Frame 590 may comprise one or more subframes. A sequence of OFDM symbols 561-567 is also transmitted over a set of subcarriers 592 in the frame 590. Each of the symbols 501-514 includes a useful symbol portion 521-534 and a CP 541-554. The CP is shown in hatching. Likewise, each of the symbols 561-567 includes a useful symbol portion 571-577 and a CP 581-587. The total symbol duration of each of the symbols 501-514 is less than the total symbol duration of each of the symbols 561-567 because the subcarrier spacing of the set of subcarriers 591 is greater than the subcarrier spacing of the set of subcarriers 592. In this example, the subcarrier spacing of the set of subcarriers 591 is twice the subcarrier spacing of the set of subcarriers 592. Consequently, the duration of each of the useful symbol portions 521-534 is half that of each of the useful symbol portions 571-577. Other examples are also possible. For example, the subcarrier spacing of the set of subcarriers 591 may be any integer multiple of the subcarrier spacing of the set of subcarriers 592.

Additionally, the cyclic prefix 541 of the leading symbol 501 has a longer duration than the cyclic prefixes 542-554 of the symbols 502-514. The long CP OFDM symbol 501 is indicated using hatching along the top of the OFDM symbol, as at 166. The long CP may help mitigate inter-symbol interference between the leading symbol 501 in the frame 590 and a trailing symbol, i.e., the last symbol, in a frame that precedes the frame 590. The CP 581 of the leading symbol 561 also has a longer duration than the cyclic prefixes 582-587 of the symbols 562-567 for similar reasons.

The longer durations of the CPs 541 and 581 cause the pair of symbols 501 and 502 to have a combined symbol duration that is different than a symbol duration of the symbol 561. As a result, the trailing edge of the symbol 502 is misaligned with the trailing edge of the symbol 561, as shown at 595. The misalignment affects the alignment of subsequent symbols as well. For example, the misalignment between the trailing edges of the symbols 502 and 561 causes the pair of symbols 503 and 504 to be misaligned with the symbol 562, which in turn causes the pair of symbols 511 and 512 to be misaligned with the symbol 566, which in turn causes the pair of symbols 513 and 514 to be misaligned with the symbol 567.

Figure 29:
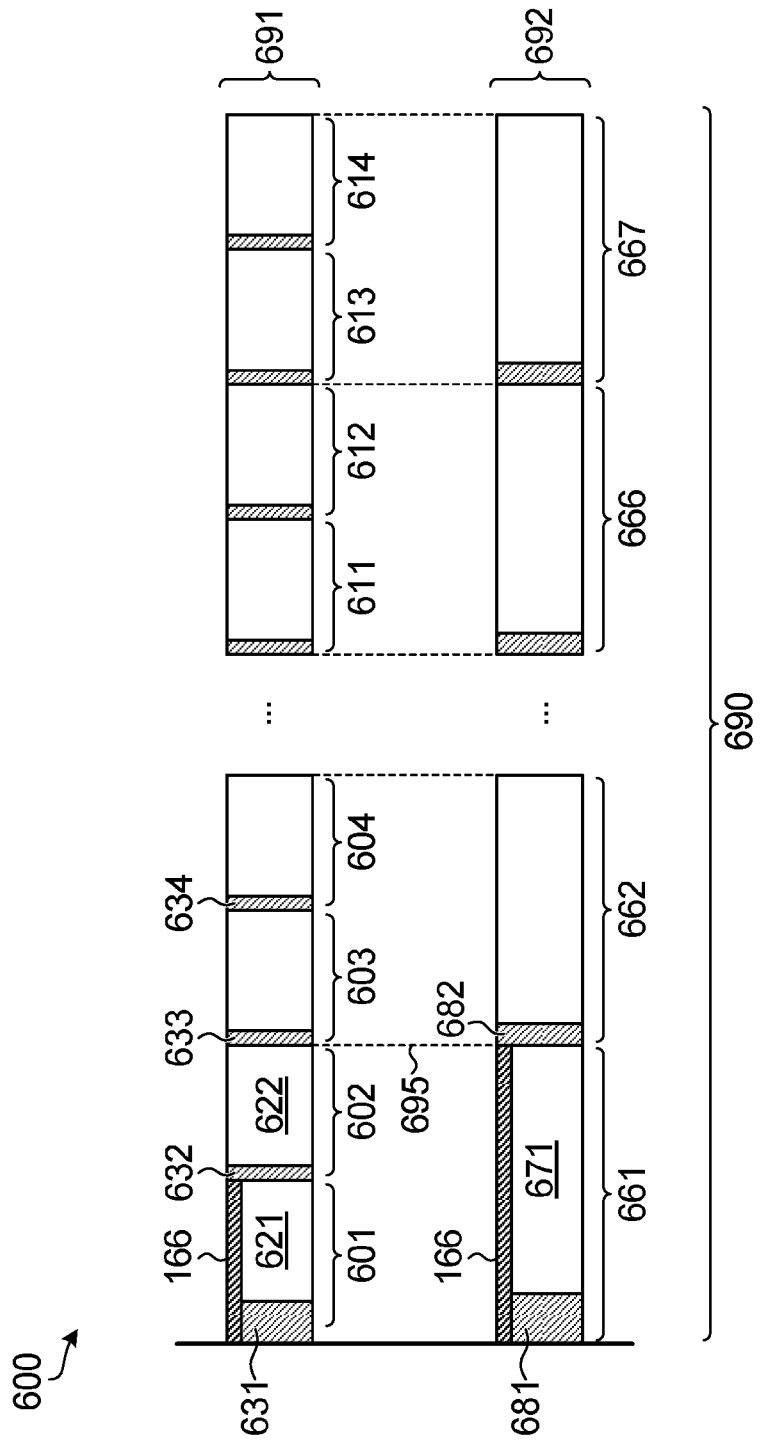

FIG. 29 illustrates a frame structure 600 for a frame 690 that carries aligned symbols over sets of subcarrier frequencies that have different subcarrier spacings. The frame 690 may comprise one or more subframes.

A sequence of OFDM symbols 601-614 is transmitted over a set of subcarriers 691, and a sequence of OFDM symbols 661-667 is transmitted over a set of subcarriers 692. The set of subcarriers 691 has a larger subcarrier spacing than the set of subcarriers 692. For example, the subcarrier spacing of subcarriers 691 may be 60 kHz and the subcarrier spacing of subcarrier 692 may be 30 kHz. As a result, the symbols 601-614 have shorter useful symbol durations, cyclic prefix durations, and total symbol durations than the symbols 661-667. However, in the frame structure 600, the duration of the cyclic prefix 631 of the leading symbol 601 is lengthened such that the trailing edge of the symbol 602 is aligned with the trailing edge of the symbol 661, as at 695. In an alternative embodiment, the cyclic prefix 681 of the leading symbol 661 could be shortened in order to align the trailing edge of the leading symbol 661 with the trailing edge of the symbol 602. As referred to herein, a trailing edge of one symbol is "aligned" with the trailing edge of another symbol if the symbols terminate within one basic time unit (Ts) of one another. The duration of a basic time unit may vary from one standard telecommunications protocol to another. By way of example, Fourth Generation Long Term Evolution (4G LTE) defines a basic time unit as 32.6 nanoseconds (ns).

By virtue of aligning the symbols 601 and 602 with the symbol 661, the leading edge of the symbol 603 is aligned with the leading edge of the symbol 662. As referred to herein, a leading edge of one symbol is "aligned" with the leading edge of another symbol if the respective symbol transmissions begin within one basic time unit (Ts) of one another. In this example, the cyclic prefixes 633 and 634 of the symbols 603 and 604 have the same duration as the cyclic prefix 632 of the symbol 602, which is approximately half the duration of the cyclic prefix 682 of the symbol 662. As a result, the trailing edge of the symbol 604 is aligned with the trailing edge of the symbol 662. The symbols 611, 612, 613, and 614 have the same cyclic prefix durations as the symbols 603 and 604, and the symbols 666 and 667 have the same cyclic prefix duration as the symbols 662. As a result, the symbols 611 and 612 are aligned with the symbol 666, and the symbols 613 and 614 are aligned with the symbol 667.

Figure 30:
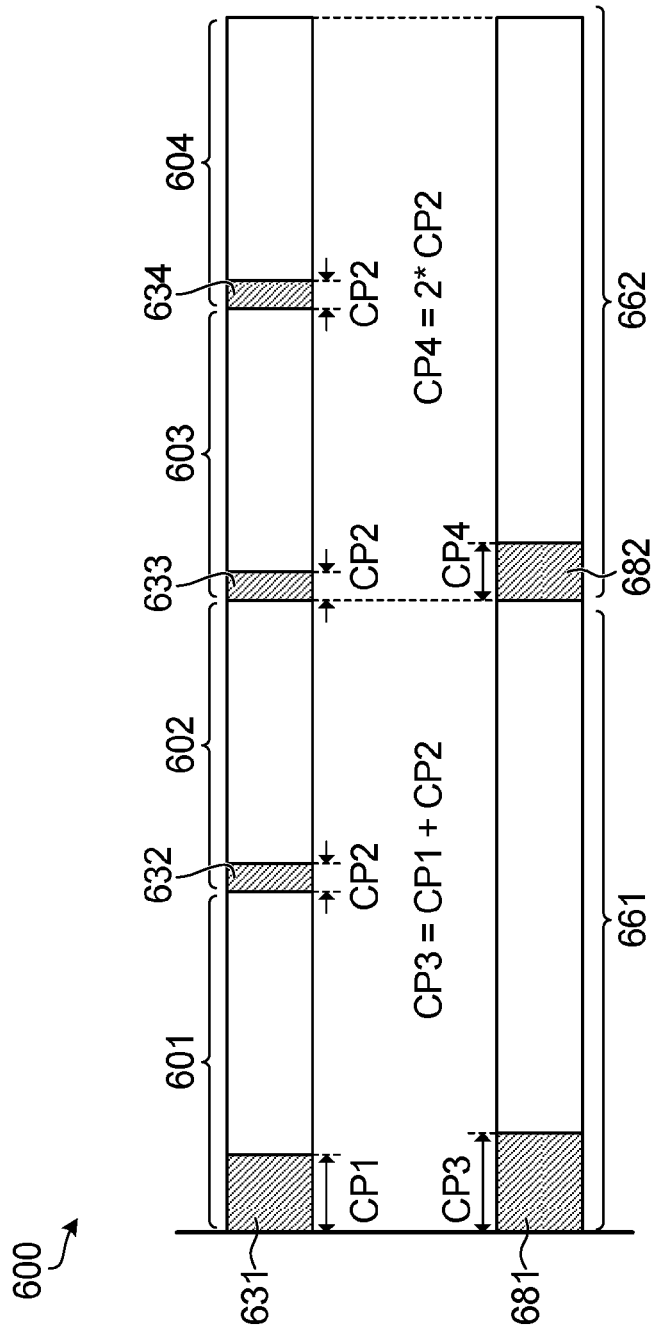

FIG. 30 is a diagram of a close up view of how the OFDM symbols 601, 602, 603, and 604 are aligned with the symbols 661 and 662 with a scalable factor of two between the two numerologies. In this example, CP1 is the duration of the cyclic prefix 631 of the leading symbol 601, CP2 is the duration of the cyclic prefix 632 of the symbol 602, CP3 is the duration of the cyclic prefix 681 of the leading symbol 661, and CP4 is the duration of the cyclic prefix 682 of the symbol 662. To ensure that the trailing edges of the symbols 602 and 661 are aligned in the time domain, the ratios of the cyclic prefixes 631, 632, and 681 are set such that CP3=CP1+CP2. To ensure that the trailing edges of the symbols 604 and 662 are aligned in the time domain, the ratios of the cyclic prefixes 633, 634, and 682 are set such that CP4=2*CP2.

Figure 31:
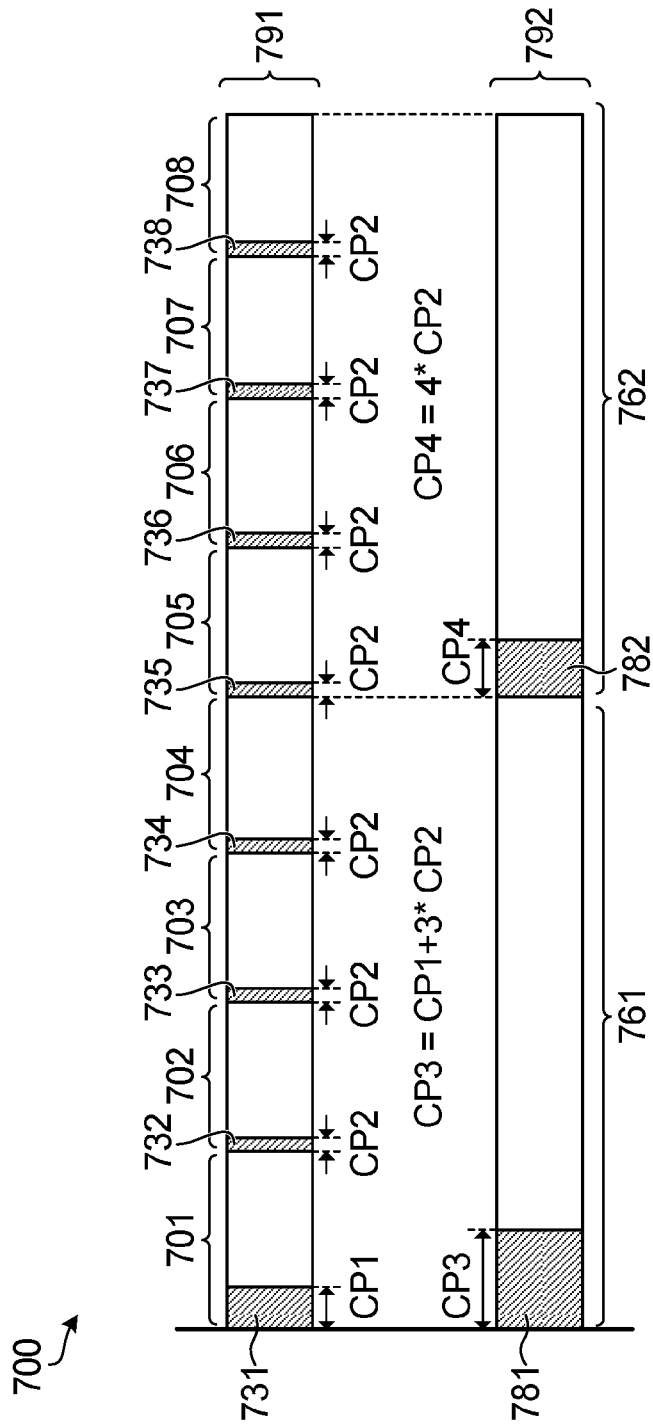

Note that FIG. 30 can be viewed as equivalent to the embodiment described earlier in relation to FIG. 23: the strip of time 438 in FIG. 23 would be the duration of CP1−CP2 in FIG. 30. CP3−CP4=CP1−CP2 holds in FIG. 30 (as well as FIG. 31), and that equals 0.52 us in FIG. 23.

CP4 is twice as long as CP 2 because the two numerologies illustrated in FIG. 30 have subcarrier spacings that differ by a factor of two. In an alternative example, referring to FIG. 31, the subcarriers 791 have four times the subcarrier spacing of the subcarriers 792 (e.g., 60 kHz and 15 kHz). The ratios of the cyclic prefixes 731, 732, 733, 734, and 781 are set such that CP3=CP1+3*CP2. To ensure that the trailing edges of the symbols 708 and 762 are aligned in the time domain, the ratios of the cyclic prefixes 735, 736, 737, 738, and 782 are set such that CP4=4*CP2. Other arrangements for aligning different ratios of symbols having different subcarrier spacings will be apparent to persons of skill in the art.

In some embodiments, groups of two or more symbols that are aligned within the same frame may be scheduled independently of one another. By way of example, the symbols 601 and 602 can be assigned to one traffic flow, and the symbols 603 and 604 can be assigned to another traffic flow. Likewise, the symbols 661 and 662 may be assigned to different traffic flows. It is further contemplated that groups of symbols within a single subframe could be scheduled independently even if not all of their symbols are aligned, as long as the beginning and end of the groups are aligned. For example, if cyclic prefix 681 was shortened and cyclic prefix 682 lengthened by the same amount, the ends of symbols 602 and 661 would no longer be aligned, but the ends of symbols 604 and 662 would remain aligned. Additionally or alternatively, two or more symbols within the same subframe may have a longer cyclic prefix duration, as will be described below with reference to FIG. 33.

Symbols communicated over sets of sub-bands having different subcarrier spacings may be aligned on a subframe basis, a slot basis, or a mini-slot basis. The number of shorter symbols that are aligned with a given longer symbol may vary based on the CP lengths of the respective symbols. Aligning subsets of symbols allows for higher granularity scheduling, which may permit lower latency data transmissions. For example, a data transmission could be scheduled mid-frame at points in which symbols align, rather than on a frame-by-frame basis.

Figure 32:
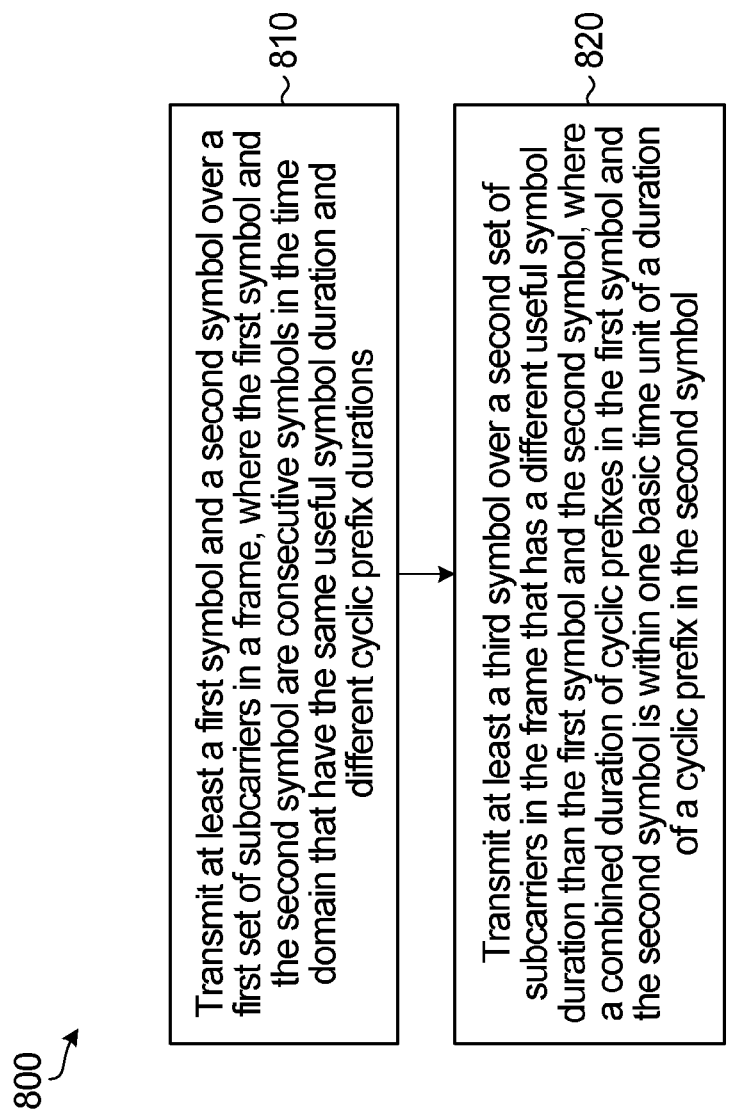
FIG. 32 is a flowchart of an embodiment of a method for transmitting data, which may be performed by a transmitter.

FIG. 32 is a flowchart of an embodiment method 800 for transmitting data, which may be performed by a transmitter. At step 810, the transmitter transmits at least a first symbol and a second symbol over a first set of subcarriers in a frame. The first symbol and the second symbol are consecutive symbols in the time domain that have the same useful symbol duration and different cyclic prefix durations. At step 820, the transmitter transmits at least a third symbol over a second set of subcarriers in the frame that has a different useful symbol duration than the first symbol and the second symbol, where a combined duration of cyclic prefixes in the first symbol and the second symbol is within one basic time unit of a duration of a cyclic prefix in the second symbol. In one embodiment, another method for wireless communication is provided. The method includes transmitting a first subframe having a first subcarrier spacing. The first subframe contains a first plurality of symbols including a first symbol and a second symbol. The first symbol includes a first cyclic prefix having a first length, and the second symbol includes a second cyclic prefix having a second length that is shorter than the first length. The method further includes transmitting a second subframe having a second subcarrier spacing that is less than the first subcarrier spacing. The second subframe contains a second plurality of symbols including at least a third symbol and a fourth symbol. The third symbol includes a third cyclic prefix having a third length, and the fourth symbol includes a fourth cyclic prefix. In any embodiment, the first, second, third, and fourth cyclic prefixes are configured such that an end of at least one symbol in the first subframe aligns in time with an end of at least one symbol in the second subframe.

Some embodiments may communicate symbols over subcarrier frequencies having 15 kHz, 30 kHz, and/or 60 kHz subcarrier spacings. The useful symbol duration for 15, 30, and 60 kHz subcarrier spacings may be 2048 basic time units, 1024 basic time units, and 512 basic time units respectively.

Figure 33:
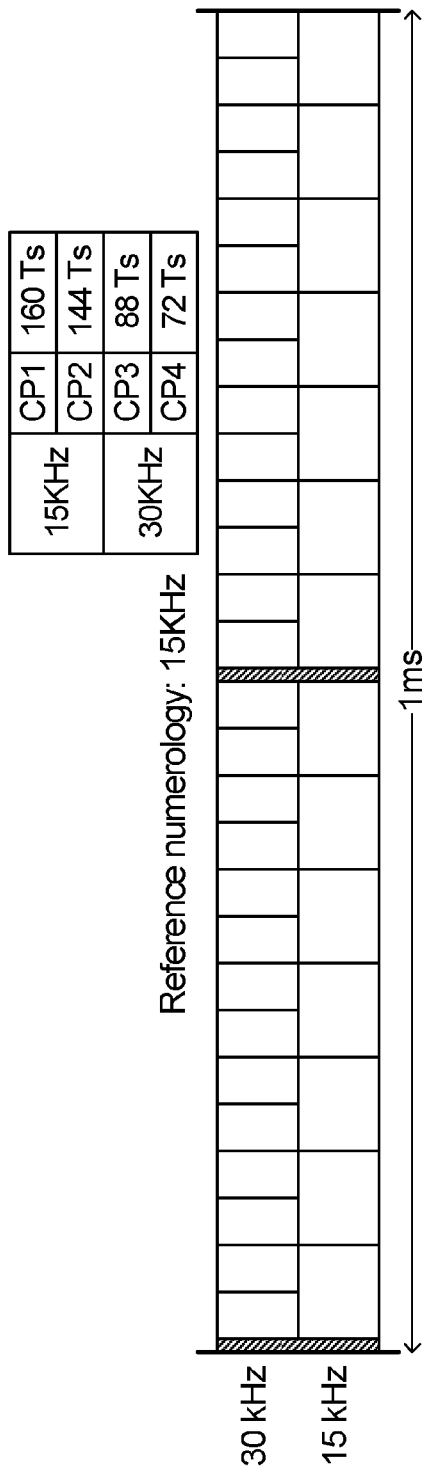
FIGS. 33 to 37 illustrate other examples of time-frequency resources of different numerologies.

FIG. 33 is a diagram of an embodiment of a frame structure for transmitting symbols over sets of subcarrier frequencies having 15 kHz and 30 kHz subcarrier spacings. In this example, the frame duration is based on the 15 kHz numerology as the reference numerology. The hatching in FIG. 33 (as well as in FIGS. 34 to 37) indicates the presence of a long CP OFDM symbol, which is positioned at the beginning of a 0.5 ms interval in FIG. 33. The hatched portion may be used for sending data.

The first 15 kHz symbol and eighth 15 kHz symbol in the frame have a cyclic prefix duration of 160 basic time units, and the other 15 kHz symbols have a cyclic prefix duration of 144 basic time units. The first 30 kHz symbol in the frame, and the fifteenth 30 kHz symbol in the frame, have a cyclic prefix duration of 88 basic time units, and the other 30 kHz symbols have a cyclic prefix duration of 72 basic time units. It is contemplated that the symbols having a longer cyclic prefix duration may instead be positioned elsewhere within the respective subframes. For example, if the nth 15 kHz symbol and the (2n−1)th 30 kHz symbol had the longer cyclic prefix duration, each pair of 30 kHz symbols would still be aligned with each 15 kHz symbol.

Figure 34:
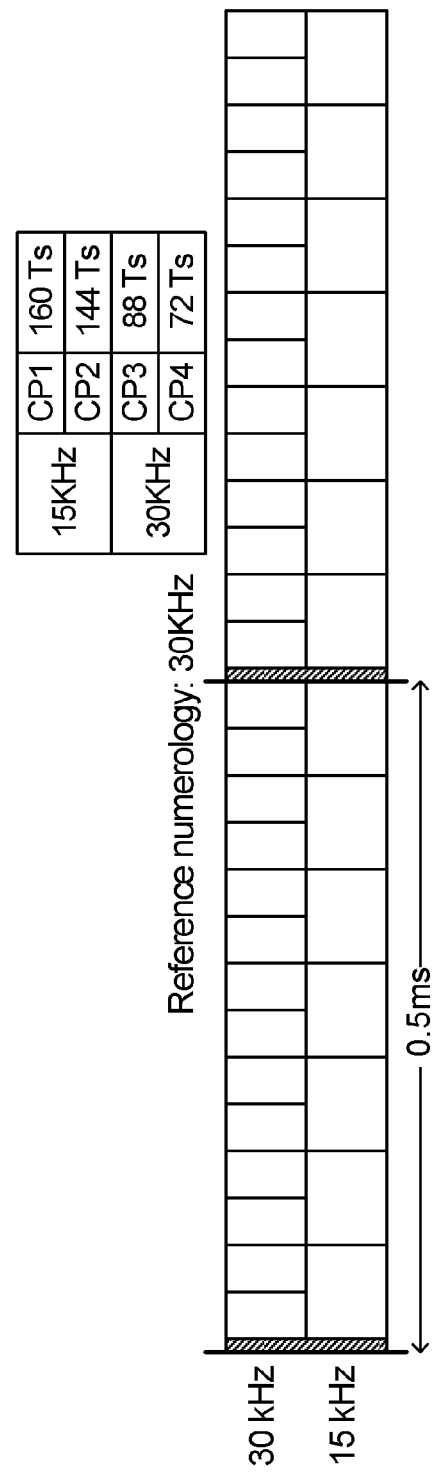

FIG. 34 is a diagram of an embodiment of a frame structure for transmitting symbols over sets of subcarrier frequencies having 15 kHz and 30 kHz subcarrier spacings. In this example, the frame duration is based on the 30 kHz numerology as the reference numerology. The first 15 kHz symbol in each 0.5 ms frame has a cyclic prefix duration of 160 basic time units, and the other 15 kHz symbols have a cyclic prefix duration of 144 basic time units. The first 30 kHz symbol in each 0.5 ms frame have a cyclic prefix duration of 88 basic time units, and the other 30 kHz symbols have a cyclic prefix duration of 72 basic time units.

In an alternative embodiment to that illustrated in FIG. 34, the first OFDM symbol having a longer CP may be present only every 1 ms, instead of every 0.5 ms. If the extra CP portion was every 1 ms instead, then the extra portion of the long CP for the $8^{th}$ symbol of 15 kHz spacing in FIG. 34 would be appended to the first OFDM symbol instead, and the $8^{th}$ symbol would instead have a CP length the same as the other OFDM symbols, except for the first OFDM symbol. 30 kHz spacing would have a similar structure, i.e., long strips grouped at the beginning of every 1 ms.

Figure 35:
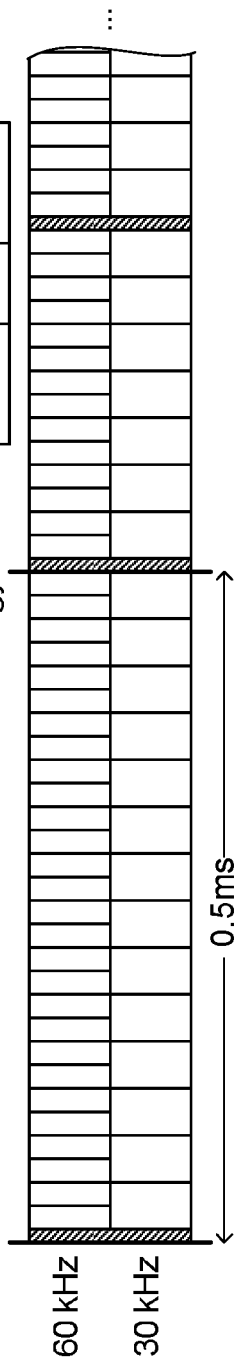

FIG. 35 is a diagram of an embodiment of a frame structure for transmitting symbols over sets of subcarrier frequencies having 30 kHz and 60 kHz subcarrier spacings. In this example, the frame duration is based on the 30 kHz numerology. The first 30 kHz symbol in each 0.5 ms frame has a cyclic prefix duration of 88 basic time units, and the other 30 kHz symbols have a cyclic prefix duration of 72 basic time units. The first 60 kHz symbol in each 0.5 ms frame has a cyclic prefix duration of 52 basic time units, and the other 60 kHz symbols have a cyclic prefix duration of 36 basic time units. In an alternative embodiment, a 0.5 ms frame based on a 30 kHz numerology may include two 30 kHz symbols with a cyclic prefix duration of 80 basic time units and twelve 30 kHz symbols with a cyclic prefix duration of 72 basic time units, as well as two 60 kHz symbols with a cyclic prefix duration of 44 basic time units and twenty-four 60 kHz symbols with a cyclic prefix duration of 36 basic time units. Each 30 kHz symbol with a cyclic prefix duration of 80 basic time units may be aligned with a pair of 60 kHz symbols that includes one 60 kHz symbol with a cyclic prefix duration of 44 basic time units and one 60 kHz symbol with a cyclic prefix duration of 36basic time units. Each 30 kHz symbol with a cyclic prefix duration of 72 basic time units may be aligned with a pair of 60 kHz symbols both of which having a cyclic prefix duration of 36 basic time units.

Figure 36:
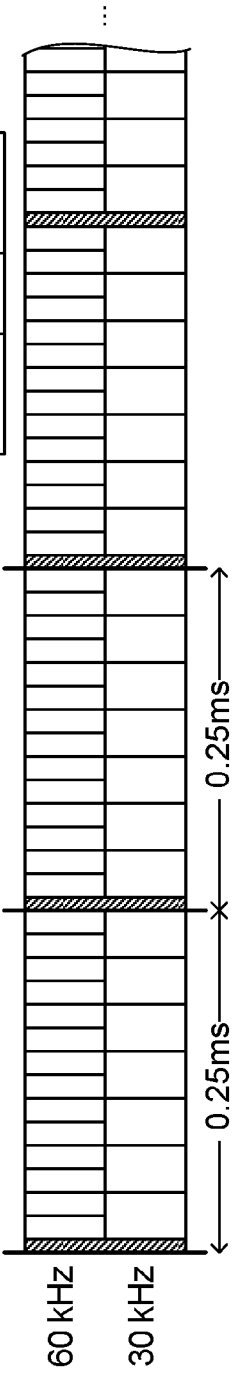

FIG. 36 is a diagram of an embodiment of a frame structure for transmitting symbols over sets of subcarrier frequencies having 30 kHz and 60 kHz subcarrier spacings. In this example, the frame duration is based on the 60 kHz numerology. The first 30 kHz symbol in each 0.25 ms frame has a cyclic prefix duration of 80 basic time units, and the other 30 kHz symbols have a cyclic prefix duration of 72 basic time units. The first 60 kHz symbol in each 0.25 ms frame has a cyclic prefix duration of 44 basic time units, and the other 60 kHz symbols have a cyclic prefix duration of 36 basic time units.

Other arrangements are contemplated. For example, having cyclic prefixes of different lengths may permit the inclusion of more symbols in one subframe than would correspond to the ratio of subcarrier spacings, resulting in higher spectral efficiency, and maintaining alignment of at least the start of the first symbol and the end of the last symbol in each numerology. Table 1 below shows some example numerologies. It can be seen that in some embodiments 14 symbols having a 15 kHz subcarrier spacing can align with more than 28 symbols having a 30 kHz subcarrier spacing or more than 56 symbols having a 60 kHz subcarrier spacing. In other embodiments, 28 symbols having a 30 kHz subcarrier spacing can align with more than 56 symbols having a 60 kHz subcarrier spacing. As an example in Table 1, one subframe of 1 ms can configure 56, 57, 58, or 59 symbols having a 60 kHz subcarrier spacing (SCS) with different CP overheads, and can align with one subframe with 14 symbols having 15 kHz SCS with normal CP. It can also align with one subframe with 28 or 29 symbols having 30 kHz SCS with different CP overheads. Other arrangements are possible, including smaller subcarrier spacings such as 3.75 kHz or 7.5 kHz, and larger subcarrier spacings such as 120 kHz.

TABLE 1

| SCS (kHz) | 15 | 30 | 30 | 60 | 60 | 60 | 60 |
|---|---|---|---|---|---|---|---|
| Subframe duration: ms | 1 | 1 | 1 | 1 | 1 | 1 | 1 |
| # of symbols | 14 (2/12) | 28 (4/24) | 29 (28/1) | 56 (8/48) | 57 (9/48) | 58 (48/10) | 59 (10/49) |
| T_useful: Ts | 2048 | 1024 | 1024 | 512 | 512 | 512 | 512 |
| CP1: Ts | 160 | 80 | 36 | 40 | 32 | 18 | 12 |
| CP2: Ts | 144 | 72 | 16 | 36 | 26 | 16 | 8 |
| CP overhead | 6.67% | 6.67% | 3.33% | 6.67% | 5% | 3.33% | 1.67% |

Figure 37:
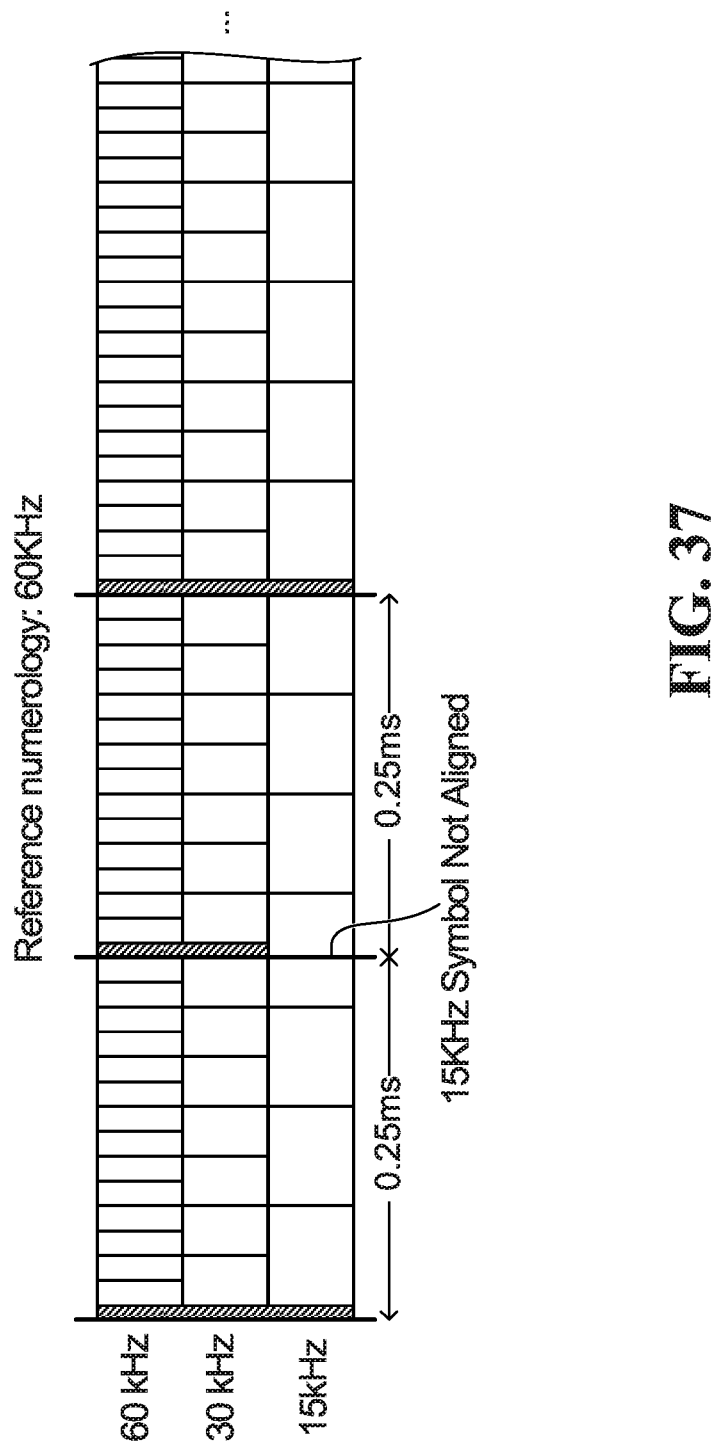

FIG. 37 is a diagram of an embodiment of a frame structure for transmitting symbols over sets of subcarrier frequencies having 15 kHz, 30 kHz, and 60 kHz subcarrier spacings. In this example, the frame duration is based on the 60 kHz numerology. In this example, the first 15 kHz symbol in every other frame is not aligned with the first 30 and 60 kHz symbols in those frames.

Offset Between Different Subframes

Symbol alignment is discussed in some of the embodiments above. However, even though there may be symbol alignment between different sets of time-frequency resources, the symbol at which a subframe begins in one set of time-frequency resources may not be the same as the symbol at which a subframe begins in another set of time-frequency resources. That is, index o of a subframe of one set of time-frequency resources may not be aligned with index 0 of a subframe of another set of time-frequency resources. Even when the two sets of time-frequency resources have the same numerology, index 0 of a subframe of one set of time-frequency resources may not be aligned with index 0 of a subframe of the other set of time-frequency resources. This is because two subframes belonging to the same numerology may still have different durations. For example, a 15 kHz subframe in an LTE system has 14 OFDM symbols comprising 2 slots of 7 OFDM symbols each, whereas a subframe in a non-LTE system may have a different number of OFDM symbols, e.g. 7 OFDM symbols. The start time between the LTE subframe and the non-LTE subframe may not be aligned, depending upon the location of the long CP OFDM symbol. In a TDD frame structure, this may potentially be the case when a long CP symbol is used as the guard period, and may not be mapped at the beginning. However, in a FDD frame structure, which does not require a guard period, symbol alignment is equivalent to subframe alignment when different systems have the same location/index for the long CP symbol with respect to the subframe. For example in FDD, one LTE subframe of 14 symbols will be both symbol and subframe aligned to two subframes of 7 symbols of a non-LTE 15 kHz subframe, where the first symbol in each subframe is the long CP symbol.

In general, the starting symbol of a subframe of one set of time-frequency resources may be offset from a starting symbol of a subframe of another set of time-frequency resources by P symbols. P may be configurable. The offset is more meaningful in a TDD architecture because of the reasons mentioned in the paragraph above.

Figure 38:
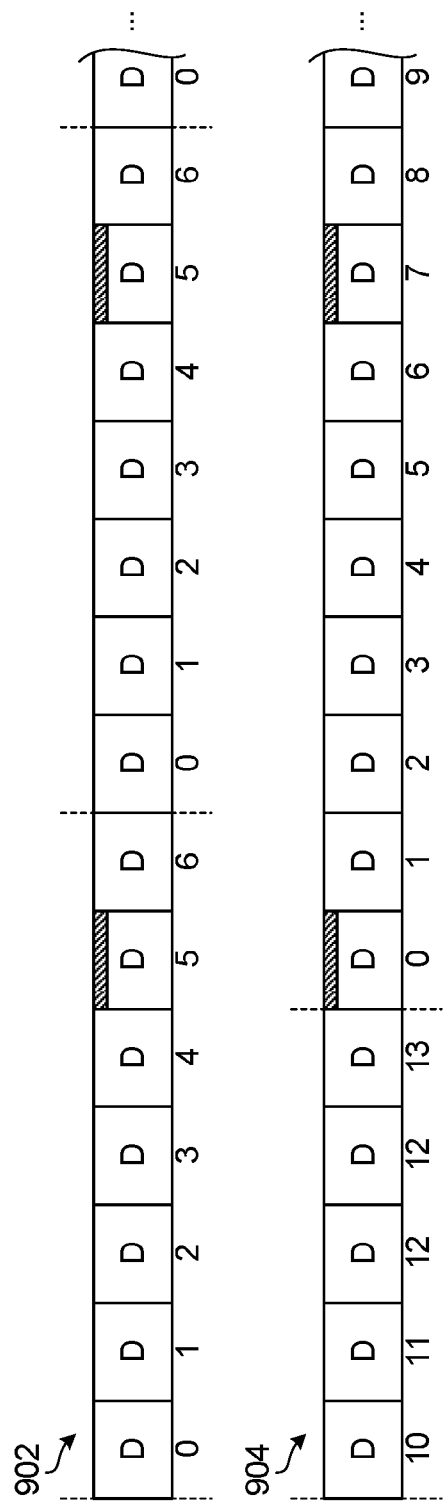
FIG. 38 illustrates two sets of time-frequency resources that are symbol aligned, but in which the first OFDM symbol of two different subframes do not align.

FIG. 38 illustrates a first set of time-frequency resources 902, and a second set of time frequency resources 904. The transmissions in each of the first set of time-frequency resources 902 and the second set of time-frequency resources 904 are symbol aligned. As in some of the previous figures, the cross-hatching at the top of an OFDM symbol indicates that the OFDM symbol is a long CP OFDM symbol. Although the time-frequency resources 902 and 904 are symbol-aligned, index o of a subframe of resources 902 is offset from index o of a subframe of resources 904 by five OFDM symbols, i.e. P=5. The number of symbols in each subframe for the different resource sets 902 and 904 in FIG. 38 is only an example.

As explained above, some embodiments set cyclic prefix durations of leading and trailing symbols such that longer symbols align in time with sets of two or more shorter symbols. Some embodiments set the cyclic prefix durations of symbols transmitted over carriers having different subcarrier spacings in a manner that aligns each longer duration symbol with a set of one or more shorter duration symbols.

Other Methods

Returning to FIG. 1, the position of particular uplink and downlink OFDM symbols in each subframe is determined in advance or semi-statically, according to the subframe structure, in order to result in the subframe and/or symbol alignment discussed above. An instruction is then stored in memory in the base station 104 and each of the UEs 106a-c. The instruction indicates the OFDM symbol time intervals, where the guard periods are, and whether the OFDM symbols are for uplink or downlink communication. UEs are then scheduled on resources by scheduler no in base station 104.

Specific embodiments are described above. More generally, methods are provided that are performed by an apparatus in a wireless communication system. The wireless communication system may be a TDD system. An apparatus is also disclosed for preforming the methods. The apparatus may be a UE or a base station. In one embodiment, a method includes transmitting and receiving data using one of a first set of time-frequency resources and a second set of time-frequency resources. A frequency spacing between subcarriers of OFDM symbols of the first set of time-frequency resources is different from the frequency spacing between subcarriers of OFDM symbols of the second set of time-frequency resources. Transmissions on the first set of time-frequency resources and the second set of time-frequency resources are subframe aligned. When the first set of time-frequency resources carries one or more downlink OFDM symbols, a downlink OFDM symbol carried by the first set of time-frequency resources overlaps in time with at least one of: a downlink OFDM symbol carried by the second set of time-frequency resources and a guard period in the second set of time-frequency resources. When the first set of time-frequency resources carries one or more uplink OFDM symbols, an uplink OFDM symbol carried by the first set of time-frequency resources overlaps in time with at least one of: an uplink OFDM symbol carried by the second set of time-frequency resources and a guard period in the second set of time-frequency resources.

In some embodiments, such as FIG. 7, for a particular duration in time: the first set of time-frequency resources includes a first guard period interposed between a first downlink OFDM symbol and a first uplink OFDM symbol; and the second set of time-frequency resources includes a second guard period interposed between a second downlink OFDM symbol and a second uplink OFDM symbol. The first guard period and the second guard period begin at different times but end at the same time.

In some embodiments, such as FIGS. 8 to 11 and 14, for a particular duration in time: the first set of time-frequency resources carries both uplink OFDM symbols and downlink OFDM symbols; the second set of time-frequency resources carries only downlink OFDM symbols and one or more guard periods; and an uplink OFDM symbol carried by the first set of time-frequency resources overlaps in time with a guard period of the second set of time-frequency resources. In some embodiments, another uplink OFDM symbol carried by the first set of time-frequency resources may partially overlap with a downlink OFDM symbol carried by the second set of time-frequency resources, e.g. as in FIG. 8, when GP 286 is replaced with an OFDM symbol.

In some embodiments, for a particular duration in time: the first set of time-frequency resources carries both uplink OFDM symbols and downlink OFDM symbols; the second set of time-frequency resources carries only uplink OFDM symbols and one or more guard periods; and a downlink OFDM symbol carried by the first set of time-frequency resources overlaps in time with a guard period carried by the second set of time-frequency resources.

In some embodiments, e.g. as in FIG. 7, a third set of time-frequency resources is also used that has a subcarrier frequency spacing that is different from a subcarrier frequency spacing of both the first set of time-frequency resources and the second set of time-frequency resources. The third set of time-frequency resources carries transmissions that are subframe aligned with transmissions of the first set of time-frequency resources and the second set of time-frequency resources. When the first set of time-frequency resources carries one or more downlink OFDM symbols, a downlink OFDM symbol carried by the first set of time-frequency resources also overlaps in time with at least one of a downlink OFDM symbol and a guard period of the third set of time-frequency resources. When the first set of time-frequency resources carries one or more uplink OFDM symbols, an uplink OFDM symbol in the first set of time-frequency resources also overlaps in time with at least one of an uplink OFDM symbol and a guard period in the third set of time-frequency resources.

In some embodiments, another method performed by an apparatus includes transmitting and receiving data in accordance with a set of time-frequency resources. The set of time-frequency resources includes: a plurality of time durations, each time duration of length $t_R$, and each time duration for transmitting or receiving a single regular CP OFDM symbol of length $t_R$; and a guard period in which there is no data transmission. The guard period is interposed between a downlink transmission and an uplink transmission. The guard period has a time duration of length $t_G \geq t_L$, where $t_L$ is equal to a time duration of a single long CP OFDM symbol, and where $t_L > t_R$. When a guard period is "interposed between" an uplink transmission, e.g. an uplink OFDM symbol, and a downlink transmission, e.g. a downlink OFDM symbol, this means that the uplink transmission may be before the downlink transmission, or vice versa. A guard period interposed between a downlink transmission and an uplink transmission means the same as a guard period interposed between an uplink transmission and a downlink transmission, and there is no implied order: downlink can come before uplink or vice versa.

In some embodiments, such as in FIGS. 15, 17, 18, and 21, the guard period has a time duration of length $t_G = k \times t_L$, where k is an integer and $k \geq 1$. The guard period may be interposed between a downlink regular CP OFDM symbol of time duration $t_R$ and an uplink regular CP OFDM symbol of time duration $t_R$. As in FIG. 18, immediately prior to the guard period the may be a time duration of length $t_L$ for communication of a single long CP OFDM symbol, and immediately subsequent to the guard period there may be a time duration of length $t_R$ for communication of a single regular CP OFDM symbol.

In some embodiments, $t_L = t_R + 1.04$ μs when a subcarrier spacing of OFDM symbols is 7.5 kHz, $t_L = t_R + 0.52$ μs when a subcarrier spacing of OFDM symbols is 15 kHz, $t_L = t_R + 0.26$ μs when a subcarrier spacing of OFDM symbols is 30 kHz, and $t_L = t_R + 0.13$ μs when a subcarrier spacing of OFDM symbols is 60 kHz.

In some embodiments, the guard period is interposed between a downlink regular CP OFDM symbol of time duration $t_R$ and an uplink regular CP OFDM symbol of time duration $t_R$, and the guard period has a time duration of length $t_G = k + t_R + t_E$, where k is an integer and $k \geq 0$, and where $t_E$ is the duration of the excess CP between a long CP OFDM symbol and a regular CP OFDM symbol for the coexisting numerology with lowest subcarrier spacing. For example, in FIG. 19 the coexisting numerology with lowest subcarrier spacing is 15 kHz. For 15 kHz the excess CP is 0.52 μs, and therefore $t_E = 0.52$ μs. As another example, in FIG. 26 the coexisting numerology with lowest subcarrier spacing is 7.5 kHz. For 7.5 kHz the excess CP is 1.04 μs, and therefore $t_E = 1.04$ μs. If 30 kHz were instead the coexisting numerology with lowest subcarrier spacing then $t_E$ would equal 0.26 μs, etc.

In some embodiments, e.g. FIG. 28, the set of time-frequency resources is a first set of time-frequency resources, transmissions on the first set of time-frequency resources are symbol aligned with transmissions on a second set of time-frequency resources, and a first OFDM symbol in a subframe of the first set of time-frequency resources is not aligned with a first OFDM symbol in a subframe of the second set of time-frequency resources.

Other Systems

Figure 39:
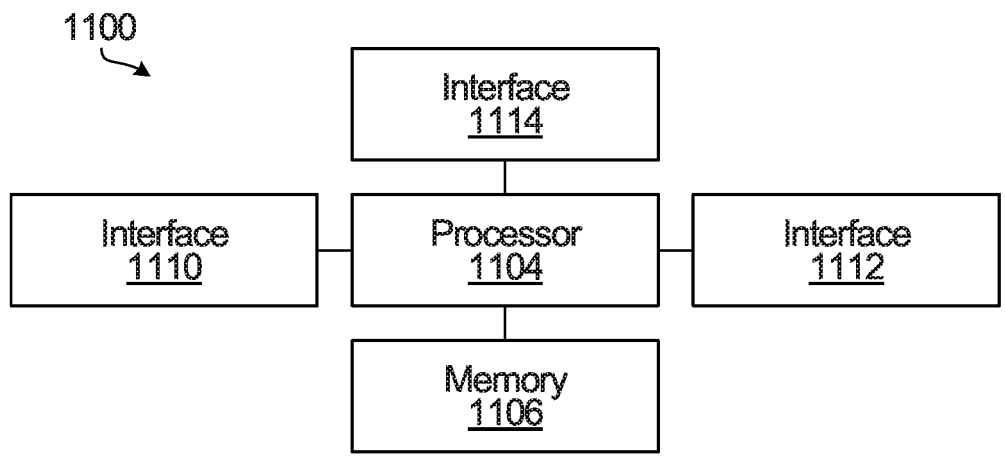
FIG. 39 is a block diagram of an embodiment processing system.

FIG. 39 is a block diagram of an embodiment processing system 1100 for performing methods described herein, which may be installed in a host device. As shown, the processing system 1100 includes a processor 1104, a memory 1106, and interfaces 1110-1114, which may or may not be arranged as shown in FIG. 39. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device, e.g., personal computer (PC), etc., to interact/communicate with the processing system 1100. The processing system 1100 may include additional components not depicted in FIG. 39, such as long term storage, e.g., non-volatile memory, etc.

In some embodiments, the processing system 1100 is included in a network device that is accessing, or otherwise part of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device, e.g., a smartwatch, etc., or any other device adapted to access a telecommunications network.

In some embodiments, one or more of the interfaces 1110, 1112, 1114 connects the processing system 1100 to a transceiver adapted to transmit and receive signaling over the telecommunications network.

Figure 40:
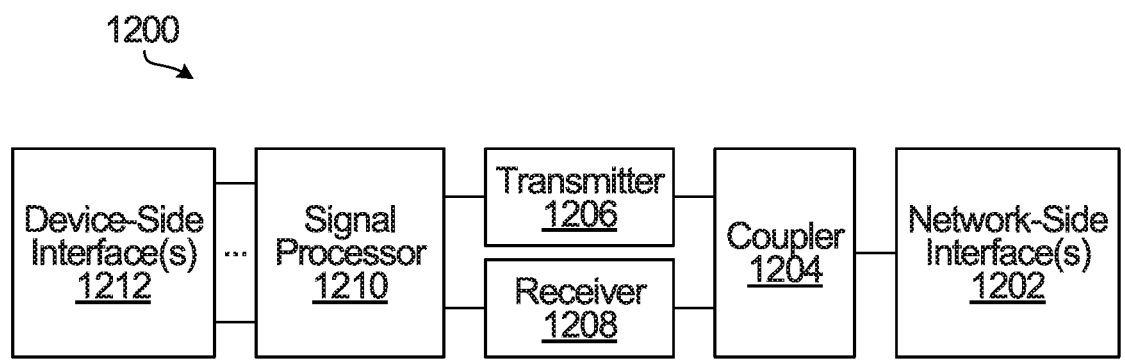
FIG. 40 is a block diagram of a transceiver adapted to transmit and receive signaling over a telecommunications network.

FIG. 40 is a diagram of a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components, e.g., up-converter, power amplifier, etc., adapted to convert a baseband signal into a modulated carrier signal suitable for transmission over the network-side interface 1202. The receiver 1208 may include any component or collection of components, e.g., down-converter, low noise amplifier, etc., adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device, e.g., the processing system 600, local area network (LAN) ports, etc.

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol, e.g., long-term evolution (LTE), etc., a wireless local area network (WLAN) protocol, e.g., Wi-Fi, etc., or any other type of wireless protocol, e.g., Bluetooth, near field communication (NFC), etc. The network-side interface 1202 may comprise one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Other Methods and Systems

FIG. 41 is an example method for transmitting data in a wireless communication system. In step 1302, k consecutive OFDM symbols are transmitted. The k consecutive OFDM symbols have a first subcarrier spacing. A first OFDM symbol of the k consecutive OFDM symbols have a time duration $t_1$, and the remaining OFDM symbols of the k consecutive OFDM symbols each have a time duration $t_2 < t_1$. The total time duration of the k consecutive OFDM symbols is T ms. In step 1304, n>k consecutive OFDM symbols are transmitted. The n consecutive OFDM symbols have a second subcarrier spacing greater than the first subcarrier spacing. A first OFDM symbol of the n consecutive OFDM symbols has a time duration $t_3$, and the remaining OFDM symbols of the n consecutive OFDM symbols each have a time duration $t_4 < t_3$. The total time duration of the n consecutive OFDM symbols is T ms.

The method described above in relation to FIG. 41 will be referred to as example 1. The following other examples are contemplated.

Example 2: The method of example 1, wherein T=0.5 ms.

Example 3: The method of example 1, wherein T=0.25 ms.

Example 4: The method of any one of examples 1 to 3, wherein the n consecutive OFDM symbols are transmitted concurrently with the k consecutive OFDM symbols.

Example 5: The method of any one of examples 1 to 4, wherein the k consecutive OFDM symbols are transmitted over a first set of subcarriers at the first subcarrier spacing, and wherein the n consecutive OFDM symbols are transmitted over a second set of subcarriers at the second subcarrier spacing.

Example 6: The method of example 5, wherein the first set of subcarriers and the second set of subcarriers belong to different carriers.

Example 7: The method of example 5, wherein the first set of subcarriers and the second set of subcarriers belong to the same carrier.

Example 8: The method of any one of examples 1 to 7, wherein the first subcarrier spacing is 15 kHz and the second subcarrier spacing is 30 kHz.

Example 9: The method of any one of examples 1 to 7, wherein the first subcarrier spacing is 30 kHz and the second subcarrier spacing is 60 kHz.

Example 10: The method of any one of examples 1 to 7, wherein k=7 and n=14.

Example 11: The method of any one of examples 1 to 10, wherein: the first OFDM symbol of the k consecutive OFDM symbols has a cyclic prefix that is longer than a cyclic prefix of each one of the remaining OFDM symbols of the k consecutive OFDM symbols; and the first OFDM symbol of the n consecutive OFDM symbols has a cyclic prefix that is longer than a cyclic prefix of each one of the remaining OFDM symbols of the n consecutive OFDM symbols.

Example 12: The method of any one of examples 1 to 11, wherein a trailing edge of the first OFDM symbol of the k consecutive OFDM symbols is aligned with a trailing edge of the second OFDM symbol of the n consecutive OFDM symbols.

Example 13: The method of any one of examples 1 to 12, wherein the second subcarrier spacing is an integer multiple of the first subcarrier spacing.

Example 14: The method of example 13, wherein the integer multiple is a power of two.

Example 15: The method of any one of examples 1 to 14, wherein the first subcarrier spacing is 15 kHz×$2^i$, where i is an integer and i≥0, and wherein the second subcarrier spacing is 15 kHz×$2^j$, where j is an integer and j>i.

Example 16: The method of any one of examples 1 to 15, wherein the method is performed by a base station.

Example 17: The method of any one of examples 1 to 15, wherein the method is performed by a UE.

Example 18: A transmitter (which may be part of a base station or a UE), or a base station, or a UE, configured to perform the method of any one of examples 1 to 15.

Example 19: An apparatus having a memory and at least one processor, the at least one processor operable to execute instructions stored in the memory to cause the apparatus to perform the method of any one of examples 1 to 15. The apparatus may be a transmitter (which may be part of a base station or a UE), or the apparatus may be a base station or a UE.

Example 20: A transmitter configured to: transmit k consecutive OFDM symbols having a first subcarrier spacing, a first OFDM symbol of the k consecutive OFDM symbols having a time duration $t_1$, and the remaining OFDM symbols of the k consecutive OFDM symbols each having a time duration $t_2 < t_1$, the total time duration of the k consecutive OFDM symbols being T ms; transmit n>k consecutive OFDM symbols having a second subcarrier spacing greater than the first subcarrier spacing, a first OFDM symbol of the n consecutive OFDM symbols having a time duration $t_3$, and the remaining OFDM symbols of the n consecutive OFDM symbols each having a time duration $t_4 < t_3$, the total time duration of the n consecutive OFDM symbols being T ms.

Example 21: The transmitter of example 20, wherein T=0.5 ms.

Example 22: The transmitter of example 20, wherein T=0.25 ms.

Example 23: The transmitter of any one of examples 20 to 22, wherein the transmitter is configured to transmit the n consecutive OFDM symbols concurrently with the k consecutive OFDM symbols.

Example 24: The transmitter of any one of examples 20 to 23, wherein the transmitter is configured to transmit the k consecutive OFDM symbols over a first set of subcarriers at the first subcarrier spacing, and transmit the n consecutive OFDM symbols over a second set of subcarriers at the second subcarrier spacing.

Example 25: The transmitter of example 24, wherein the first set of subcarriers and the second set of subcarriers belong to different carriers.

Example 26: The transmitter of example 24, wherein the first set of subcarriers and the second set of subcarriers belong to the same carrier.

Example 27: The transmitter of any one of examples 20 to 26, wherein the first subcarrier spacing is 15 kHz and the second subcarrier spacing is 30 kHz.

Example 28: The transmitter of any one of examples 20 to 26, wherein the first subcarrier spacing is 30 kHz and the second subcarrier spacing is 60 kHz.

Example 29: The transmitter of any one of examples 20 to 26, wherein k=7 and n=14.

Example 30: The transmitter of any one of examples 20 to 29, wherein: the first OFDM symbol of the k consecutive OFDM symbols has a cyclic prefix that is longer than a cyclic prefix of each one of the remaining OFDM symbols of the k consecutive OFDM symbols; and the first OFDM symbol of the n consecutive OFDM symbols has a cyclic prefix that is longer than a cyclic prefix of each one of the remaining OFDM symbols of the n consecutive OFDM symbols.

Example 31: The transmitter of any one of examples 20 to 30, wherein a trailing edge of the first OFDM symbol of the k consecutive OFDM symbols is aligned with a trailing edge of the second OFDM symbol of the n consecutive OFDM symbols.

Example 32: The transmitter of any one of examples 20 to 31, wherein the second subcarrier spacing is an integer multiple of the first subcarrier spacing.

Example 33: The transmitter of example 32, wherein the integer multiple is a power of two.

Example 34: The transmitter of any one of examples 20 to 33, wherein the first subcarrier spacing is 15 kHz$\times 2^i$, where i is an integer and i≥0, and wherein the second subcarrier spacing is 15 kHz$\times 2^j$, where j is an integer and j>i.

Example 35: The transmitter of any one of examples 20 to 34, wherein the transmitter is part of a base station.

Example 36: The transmitter of any one of examples 20 to 35, wherein the transmitter is part of a UE.

FIG. 42 is an example method for transmitting data in a wireless communication system. In step 1402, OFDM symbols are generated. Step 1402 is optional. The method may instead start at step 1404. In step 1404, k consecutive OFDM symbols are transmitted over a set of subcarriers having a subcarrier spacing of 15 kHz$\times 2^n$. n is an integer and n≥1. A first OFDM symbol of the k consecutive OFDM symbols has a time duration $t_1$, and the remaining OFDM symbols of the k consecutive OFDM symbols each have a time duration $t_2 < t_1$. The total time duration of the k consecutive OFDM symbols is T ms, where T=0.5 ms or T=0.25 ms.

The method described above in relation to FIG. 42 will be referred to as example 37. The following other examples are contemplated.

Example 38: The method of example 37, wherein the first OFDM symbol has a cyclic prefix that is longer than a cyclic prefix of each one of the remaining OFDM symbols.

Example 39: The method of example 37 or example 38, wherein n=1 such that the subcarrier spacing is 30 kHz.

Example 40: The method of any one of examples 37 to 39, wherein the method is performed by a base station.

Example 41: The method of any one of examples 37 to 39, wherein the method is performed by a user equipment (UE).

Example 42: A transmitter (which may be part of a base station or a UE), or a base station, or a UE, configured to perform the method of any one of examples 37 to 39.

Example 43: An apparatus having a memory and at least one processor, the at least one processor operable to execute instructions stored in the memory to cause the apparatus to perform the method of any one of examples 37 to 39. The apparatus may be a transmitter (which may be part of a base station or a UE), or the apparatus may be a base station or a UE.

Example 44: A transmitter configured to: transmit k consecutive OFDM symbols over a set of subcarriers having a subcarrier spacing of 15 kHz$\times 2^n$, where n is an integer and n≥1; a first OFDM symbol of the k consecutive OFDM symbols having a time duration $t_1$, and the remaining OFDM symbols of the k consecutive OFDM symbols each having a time duration $t_2 < t_1$, the total time duration of the k consecutive OFDM symbols being 0.5 ms.

Example 45: The transmitter of example 44, wherein the first OFDM symbol has a cyclic prefix that is longer than a cyclic prefix of each one of the remaining OFDM symbols.

Example 46: The transmitter of example 44 or example 45, wherein n=1 such that the subcarrier spacing is 30 kHz.

Example 47: The transmitter of any one of examples 44 to 46, wherein the transmitter is part of a base station.

Example 48: The transmitter of any one of examples 44 to 46, wherein the transmitter is part of a user equipment (UE).

Figure 43:
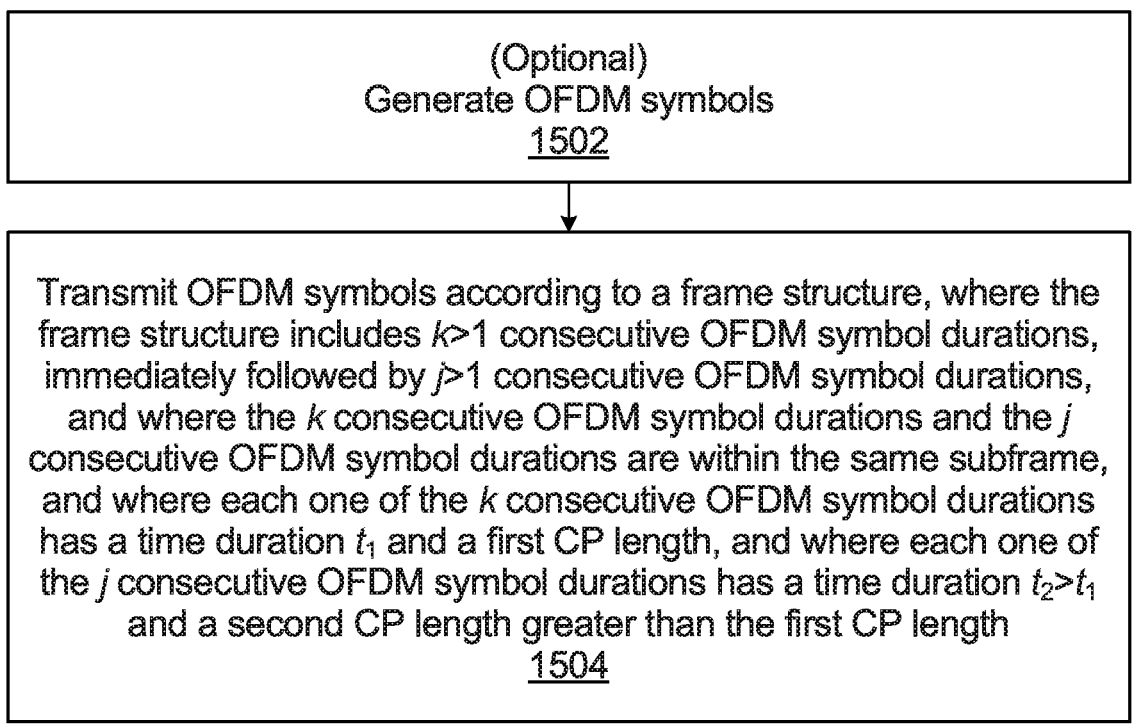

FIG. 43 is an example method for transmitting data in a wireless communication system. In step 1502, OFDM symbols are generated. Step 1502 is optional. The method may instead start at step 1504. In step 1504, the plurality of OFDM symbols are transmitted according to a frame structure. The frame structure includes k>1 consecutive OFDM symbol durations, immediately followed by j>1 consecutive OFDM symbol durations. The k consecutive OFDM symbol durations and the j consecutive OFDM symbol durations are within the same subframe. Each one of the k consecutive OFDM symbol durations has a time duration $t_1$ and a first cyclic prefix (CP) length. Each one of the j consecutive OFDM symbol durations has a time duration $t_2 > t_1$ and a second CP length greater than the first CP length.

The method described above in relation to FIG. 43 will be referred to as example 49. The following other examples are contemplated.

Example 50: The method of example 49, wherein at least some of the j consecutive OFDM symbol durations form a guard period in the subframe.

Example 51: The method of example 50, wherein all of the j consecutive OFDM symbol durations form a guard period in the subframe.

Example 52: The method of any one of examples 49 to 51, wherein the k consecutive OFDM symbol durations are at a start of the subframe.

Example 53: The method of any one of examples 49 to 52, wherein the plurality of OFDM symbols are a first plurality of OFDM symbols having a first subcarrier spacing, and the method further comprising: transmitting a second plurality of OFDM symbols having a second subcarrier spacing, wherein a transmitted OFDM symbol of the second plurality of OFDM symbols has a duration that is an integer multiple of a duration of a concurrently transmitted OFDM symbol of the first plurality of OFDM symbols.

Example 54: The method of example 53, wherein the second subcarrier spacing is 15 kHz$\times 2^i$, where i is an integer and i≥0, and wherein the first subcarrier spacing is 15 kHz$\times 2^m$, where m is an integer and m>i.

Example 55: The method of example 54, wherein the second subcarrier spacing is 15 kHz and the first subcarrier spacing is 60 kHz.

Example 56: A transmitter (which may be part of a base station or a UE), or a base station, or a UE, configured to perform the method of any one of examples 49 to 55.

Example 57: An apparatus having a memory and at least one processor, the at least one processor operable to execute instructions stored in the memory to cause the apparatus to perform the method of any one of examples 49 to 55. The apparatus may be a transmitter (which may be part of a base station or a UE), or the apparatus may be a base station or a UE.

Example 58: A transmitter configured to: optionally generate a plurality of OFDM symbols; transmit the plurality of OFDM symbols according to a frame structure, the frame structure comprising: k>1 consecutive OFDM symbol durations, immediately followed by j>1 consecutive OFDM symbol durations; the k consecutive OFDM symbol durations and the j consecutive OFDM symbol durations within the same subframe, and each one of the k consecutive OFDM symbol durations having a time duration $t_1$ and a first cyclic prefix (CP) length, and each one of the j consecutive OFDM symbol durations having a time duration $t_2 > t1$ and a second CP length greater than the first CP length.

Example 59: The transmitter of example 58, wherein at least some of the j consecutive OFDM symbol durations form a guard period in the subframe.

Example 60: The transmitter of example 59, wherein all of the j consecutive OFDM symbol durations form a guard period in the subframe.

Example 61: The transmitter of any one of examples 58 to 60, wherein the k consecutive OFDM symbol durations are at a start of the subframe.

Example 62: The transmitter of any one of examples 58 to 61, wherein the plurality of OFDM symbols are a first plurality of OFDM symbols having a first subcarrier spacing, and the transmitter is further configured to: transmit a second plurality of OFDM symbols having a second subcarrier spacing, wherein a transmitted OFDM symbol of the second plurality of OFDM symbols has a duration that is an integer multiple of a duration of a concurrently transmitted OFDM symbol of the first plurality of OFDM symbols.

Example 63: The transmitter of example 62, wherein the second subcarrier spacing is 15 kHz$\times 2^i$, where i is an integer and i≥0, and wherein the first subcarrier spacing is 15 kHz$\times 2^m$, where m is an integer and m>i.

Example 64: The transmitter of example 63, wherein the second subcarrier spacing is 15 kHz and the first subcarrier spacing is 60 kHz.

Further examples are contemplated below.

Example 65: At least a first symbol and a second symbol are transmitted over a first set of subcarriers in a frame. The first symbol and the second symbol are consecutive symbols in the time domain. The first symbol and the second symbol have the same useful symbol duration and different cyclic prefix durations. At least a third symbol is transmitted over a second set of subcarriers in the frame. The third symbol has a different useful symbol duration than the first symbol and the second symbol. A combined duration of cyclic prefixes in the first symbol and the second symbol is within one basic time unit of a duration of a cyclic prefix in the second symbol.

Example 66: The method of example 65, wherein the first set of subcarriers have a different subcarrier spacing than the second set of subcarriers.

Example 67: The method of example 65, wherein a leading edge of the first symbol aligns with a leading edge of the third symbol in the time domain, and wherein a trailing edge of the second symbol aligns with a trailing edge of the third symbol in the time domain.

Example 68: The method of example 65, wherein a combination of total symbol durations of the first symbol and the second symbol is less than one basic time unit of a total symbol duration of the third symbol.

Example 69: The method of example 65, further comprising: transmitting at least a fourth symbol and a fifth symbol over the first set of subcarriers in the frame, the fourth symbol and the fifth symbol having the same useful symbol duration as the first symbol and the second symbol; and transmitting at least a sixth symbol over the second set of subcarriers in the frame, the sixth symbol having the same useful symbol duration as the third symbol but a different cyclic prefix duration than the third symbol, wherein a combined duration of cyclic prefixes in the fourth symbol and the fifth symbol is within one basic time unit of a duration of a cyclic prefix in the second symbol.

Example 70: The method of example 69, wherein a duration of a cyclic prefix in the fourth symbol is equal to a cyclic prefix in the fifth symbol.

Example 71: The method of example 69, wherein a duration of a cyclic prefix in the fourth symbol is half the duration of a cyclic prefix in the sixth symbol.

Example 72: An apparatus comprising: a processor; and a non-transitory computer readable storage medium storing programming for execution by the processor, the programming including instructions to: transmit at least a first symbol and a second symbol over a first set of subcarriers in a frame, the first symbol and the second symbol being consecutive symbols in the time domain, the first symbol and the second symbol having the same useful symbol duration and different cyclic prefix durations; and transmit at least a third symbol over a second set of subcarriers in the frame, the third symbol having a different useful symbol duration than the first symbol and the second symbol, wherein a combined duration of cyclic prefixes in the first symbol and the second symbol is within one basic time unit of a duration of a cyclic prefix in the second symbol.

Example 73: A computer program product comprising a non-transitory computer readable storage medium storing programming, the programming including instructions to: transmit at least a first symbol and a second symbol over a first set of subcarriers in a frame, the first symbol and the second symbol being consecutive symbols in the time domain, the first symbol and the second symbol having the same useful symbol duration and different cyclic prefix durations; and transmit at least a third symbol over a second set of subcarriers in the frame, the third symbol having a different useful symbol duration than the first symbol and the second symbol, wherein a combined duration of cyclic prefixes in the first symbol and the second symbol is within one basic time unit of a duration of a cyclic prefix in the second symbol.

Example 74: A method performed by an apparatus in a wireless communication system, the method comprising: transmitting and receiving data using at least one of a first set of time/frequency resources and a second set of time/frequency resources; wherein a frequency spacing between subcarriers of OFDM symbols carried by the first set of time/frequency resources is different from the frequency spacing between subcarriers of OFDM symbols carried by the second set of time/frequency resources, and wherein transmissions on the first set of time/frequency resources and the second set of time/frequency resources are subframe aligned; wherein when the first set of time/frequency resources carries one or more downlink OFDM symbols, a downlink OFDM symbol carried by the first set of time/frequency resources overlaps in time with at least one of: a downlink OFDM symbol carried by the second set of time/frequency resources and a guard period in the second set of time/frequency resources; and wherein when the first set of time/frequency resources carries one or more uplink OFDM symbols, an uplink OFDM symbol carried by the first set of time/frequency resources overlaps in time with at least one of: an uplink OFDM symbol carried by the second set of time/frequency resources and a guard period in the second set of time/frequency resources.

Example 75: The method of example 74, wherein for a particular duration in time: the first set of time/frequency resources includes a first guard period interposed between a first downlink OFDM symbol and a first uplink OFDM symbol; and the second set of time/frequency resources includes a second guard period interposed between a second downlink OFDM symbol and a second uplink OFDM symbol; wherein the first guard period and the second guard period begin at different times but end at the same time.

Example 76: The method of example 74, wherein for a particular duration in time: the first set of time/frequency resources carries both uplink OFDM symbols and downlink OFDM symbols; the second set of time/frequency resources carries only downlink OFDM symbols and includes one or more guard periods; and an uplink OFDM symbol carried by the first set of time/frequency resources overlaps in time with a guard period in the second set of time/frequency resources.

Example 77: The method of example 76, wherein another uplink OFDM symbol carried by the first set of time/frequency resources partially overlaps with a downlink OFDM symbol carried by the second set of time/frequency resources.

Example 78: The method of example 74, wherein for a particular duration in time: the first set of time/frequency resources carries both uplink OFDM symbols and downlink OFDM symbols; the second set of time/frequency resources carries only uplink OFDM symbols and includes one or more guard periods; and a downlink OFDM symbol carried by the first set of time/frequency resources overlaps in time with a guard period in the second set of time/frequency resources.

Example 79: The method of example 74, wherein: a third set of time/frequency resources has a subcarrier frequency spacing that is different from a subcarrier frequency spacing of both the first set of time/frequency resources and the second set of time/frequency resources; transmissions on the third set of time/frequency resources are subframe aligned with transmissions on the first set of time/frequency resources and the second set of time/frequency resources; when the first set of time/frequency resources carries one or more downlink OFDM symbols, a downlink OFDM symbol carried by the first set of time/frequency resources also overlaps in time with at least one of a downlink OFDM symbol carried by the third set of time/frequency resources and a guard period in the third set of time/frequency resources; and when the first set of time/frequency resources carries one or more uplink OFDM symbols, an uplink OFDM symbol carried by the first set of time/frequency resources also overlaps in time with at least one of an uplink OFDM symbol carried by the third set of time/frequency resources and a guard period in the third set of time/frequency resources.

Example 80: The method of example 78, wherein the subcarrier frequency spacing of the first set of time/frequency resources is 7.5 kHz, the subcarrier frequency spacing of the second set of time/frequency resources is 15 kHz, and the subcarrier frequency spacing of the third set of time/frequency resources is 30 kHz.

Example 81: The method of any one of examples 74 to 80, wherein the apparatus is a base station or a mobile device.

Example 82: The method of any one of examples 74 to 81, wherein one of the first set of time/frequency resources and the second set of time/frequency resources has a subcarrier frequency spacing of 15 kHz, and the other of the first set of time/frequency resources and the second set of time/frequency resources has a subcarrier frequency spacing of 30 kHz.

Example 83: An apparatus comprising: at least one antenna to transmit and receive data using at least one of a first set of time/frequency resources and a second set of time/frequency resources, in a wireless communication system; wherein a frequency spacing between subcarriers of OFDM symbols that use the first set of time/frequency resources is different from the frequency spacing between subcarriers of OFDM symbols that use the second set of time/frequency resources, and wherein transmissions on the first set of time/frequency resources and the second set of time/frequency resources are subframe aligned; wherein when the first set of time/frequency resources carries one or more downlink OFDM symbols, a downlink OFDM symbol carried by the first set of time/frequency resources overlaps in time with at least one of: a downlink OFDM symbol carried by the second set of time/frequency resources and a guard period in the second set of time/frequency resources; and wherein when the first set of time/frequency resources carries one or more uplink OFDM symbols, an uplink OFDM symbol carried by the first set of time/frequency resources overlaps in time with at least one of: an uplink OFDM symbol carried by the second set of time/frequency resources and a guard period in the second set of time/frequency resources.

Example 84: A method performed by an apparatus in a wireless communication system, the method comprising: transmitting and receiving data using a set of time/frequency resources, the set of time/frequency resources including: a plurality of time durations, each time duration of length $t_R$, and each time duration for transmitting or receiving a single regular cyclic prefix (CP) OFDM symbol of time duration $t_R$; a guard period in which there is no data transmission, the guard period interposed between a downlink transmission and an uplink transmission; wherein the guard period has a time duration of length $t_G \geq t_L$, wherein $t_L$ is equal to a time duration of a single long CP OFDM symbol, and wherein $t_L > t_R$.

Example 85: The method of example 84, wherein the guard period has a time duration of length $t_G = k \times t_L$, wherein k is an integer and $k \geq 1$.

Example 86: The method of example 85, wherein the guard period is interposed between a downlink regular CP OFDM symbol of time duration $t_R$ and an uplink regular CP OFDM symbol of time duration $t_R$.

Example 87: The method of example 85, wherein immediately prior to the guard period there is a time duration of length $t_L$ for communication of a single long CP OFDM symbol, and wherein immediately subsequent to the guard period there is a time duration of length $t_R$ for communication of a single regular CP OFDM symbol.

Example 88: The method of example 84, wherein the guard period is interposed between a downlink regular CP OFDM symbol of time duration $t_R$ and an uplink regular CP OFDM symbol of time duration $t_R$, and wherein the guard period has a time duration of length $t_G = k \times t_R + t_E$, wherein k is an integer and $k \geq 0$, and wherein $t_E$ is the duration of the excess CP between a long CP OFDM symbol and a regular CP OFDM symbol for the coexisting numerology with lowest subcarrier spacing.

Example 89: The method of any one of examples 84 to 87, wherein $t_L = t_R + 1.04$ µs when a subcarrier spacing of OFDM symbols is 7.5 kHz, wherein $t_L = t_R + 0.52$ µs when a subcarrier spacing of OFDM symbols is 15 kHz, wherein $t_L = t_R + 0.26$ µs when a subcarrier spacing of OFDM symbols is 30 kHz, and wherein $t_L = t_R + 0.13$ µs when a subcarrier spacing of OFDM symbols is 60 kHz.

Example 90: The method of any one of examples 84 to 89, wherein the apparatus is a base station or a mobile device.

Example 91: The method of any one of examples 84 to 90, wherein the set of time/frequency resources is a first set of time/frequency resources, wherein transmissions on the first set of time/frequency resources are symbol aligned with transmissions on a second set of time/frequency resources, and wherein a first OFDM symbol in a subframe of the first set of time/frequency resources is not aligned with a first OFDM symbol in a subframe of the second set of time/frequency resources.

Example 92: An apparatus comprising: at least one antenna to transmit and receive data using a set of time/frequency resources in a wireless communication system, the set of time/frequency resources including: a plurality of time durations, each time duration of length $t_R$, and each time duration for transmitting or receiving a single regular cyclic prefix (CP) OFDM symbol of time duration $t_R$; a guard period in which there is no data transmission, the guard period interposed between a downlink transmission and an uplink transmission; wherein the guard period has a time duration of length $t_G \geq t_L$, wherein $t_L$ is equal to a time duration of a single long CP OFDM symbol, and wherein $t_L > t_R$.

Conclusion

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:

1. A method for transmitting data in a wireless communication system, the method comprising:
transmitting k consecutive orthogonal frequency division multiplexing (OFDM) symbols having a first subcarrier spacing, a first OFDM symbol of the k consecutive OFDM symbols having a time duration $t_1$, and the remaining OFDM symbols of the k consecutive OFDM symbols each having a time duration $t_2<t_1$, a total time duration of the k consecutive OFDM symbols being 0.5 ms; and transmitting n>k consecutive OFDM symbols having a second subcarrier spacing greater than the first subcarrier spacing, a first OFDM symbol of then consecutive OFDM symbols having a time duration $t_3$, and the remaining OFDM symbols of the n consecutive OFDM symbols each having a time duration $t_4<t_3$, a total time duration of the n consecutive OFDM symbols being 0.5 ms.

2. The method of claim 1, wherein the n consecutive OFDM symbols are transmitted concurrently with the k consecutive OFDM symbols.

3. The method of claim 1, wherein the k consecutive OFDM symbols are transmitted over a first set of subcarriers at the first subcarrier spacing, and wherein the n consecutive OFDM symbols are transmitted over a second set of subcarriers at the second subcarrier spacing.

4. The method of claim 3, wherein the first set of subcarriers and the second set of subcarriers belong to different carriers.

5. The method of claim 3, wherein the first set of subcarriers and the second set of subcarriers belong to a same carrier.

6. The method of claim 1, wherein the first subcarrier spacing is 15 kHz and the second subcarrier spacing is 30 kHz.

7. The method of claim 1, wherein the first subcarrier spacing is 30 kHz and the second subcarrier spacing is 60 kHz.

8. The method of claim 1, wherein the n consecutive OFDM symbols are transmitted concurrently with the k consecutive OFDM symbols, and $t_3-t_4=t_1-t_2$ and $t_4<t_2$.

9. The method of claim 1, wherein the n consecutive OFDM symbols are transmitted concurrently with the k consecutive OFDM symbols, and n is an integer multiple of k.

10. The method of claim 9, wherein k=7 and n=14.

11. The method of claim 1, wherein:
the first OFDM symbol of the k consecutive OFDM symbols has a cyclic prefix that is longer than a cyclic prefix of each one of the remaining OFDM symbols of the k consecutive OFDM symbols; and
the first OFDM symbol of then consecutive OFDM symbols has a cyclic prefix that is longer than a cyclic prefix of each one of the remaining OFDM symbols of the n consecutive OFDM symbols.

12. The method of claim 1, wherein a trailing edge of the first OFDM symbol of the k consecutive OFDM symbols is aligned with a trailing edge of the second OFDM symbol of the n consecutive OFDM symbols.

13. The method of claim 1, wherein the second subcarrier spacing is an integer multiple of the first subcarrier spacing.

14. The method of claim 13, wherein the integer multiple is a power of two.

15. The method of claim 1, wherein the first subcarrier spacing is 15 kHz×$2^i$, where i is an integer and i≥0, and wherein the second subcarrier spacing is 15 kHz×$2^j$, where j is an integer and j>i.

16. The method of claim 1, wherein the method is performed by a base station.

17. A transmitter comprising:
a non-transitory memory storage comprising instructions; and
one or more processors in communication with the non-transitory memory storage, wherein the one or more processors execute the instructions to:
transmit k consecutive orthogonal frequency division multiplexing (OFDM) symbols having a first subcarrier spacing, a first OFDM symbol of the k consecutive OFDM symbols having a time duration $t_1$, and the remaining OFDM symbols of the k consecutive OFDM symbols each having a time duration $t_2<t_1$, a total time duration of the k consecutive OFDM symbols being 0.5 ms; and
transmit n>k consecutive OFDM symbols having a second subcarrier spacing greater than the first subcarrier spacing, a first OFDM symbol of then consecutive OFDM symbols having a time duration $t_3$, and the remaining OFDM symbols of the n consecutive OFDM symbols each having a time duration $t_4<t_3$, a total time duration of then consecutive OFDM symbols being 0.5 ms.

18. The transmitter of claim 17, wherein the one or more processors execute the instructions to transmit the n consecutive OFDM symbols concurrently with the k consecutive OFDM symbols.

19. The transmitter of claim 17, wherein the one or more processors execute the instructions to transmit the k consecutive OFDM symbols over a first set of subcarriers at the first subcarrier spacing, and transmit the n consecutive OFDM symbols over a second set of subcarriers at the second subcarrier spacing.

20. The transmitter of claim 19, wherein the first set of subcarriers and the second set of subcarriers belong to different carriers.

21. The transmitter of claim 19, wherein the first set of subcarriers and the second set of subcarriers belong to a same carrier.

22. The transmitter of claim 17, wherein the first subcarrier spacing is 15 kHz and the second subcarrier spacing is 30 kHz.

23. The transmitter of claim 17, wherein the first subcarrier spacing is 30 kHz and the second subcarrier spacing is 60 kHz.

24. The transmitter of claim 17, wherein the n consecutive OFDM symbols are transmitted concurrently with the k consecutive OFDM symbols, and $t_3-t_4=t_1-t_2$ and $t_4<t_2$.

25. The transmitter of claim 17, wherein the n consecutive OFDM symbols are transmitted concurrently with the k consecutive OFDM symbols, and n is an integer multiple of k.

26. The transmitter of claim 25, wherein k=7 and n=14.

27. The transmitter of claim 17, wherein:
the first OFDM symbol of the k consecutive OFDM symbols has a cyclic prefix that is longer than a cyclic prefix of each one of the remaining OFDM symbols of the k consecutive OFDM symbols; and
the first OFDM symbol of then consecutive OFDM symbols has a cyclic prefix that is longer than a cyclic prefix of each one of the remaining OFDM symbols of the n consecutive OFDM symbols.

28. The transmitter of claim 17, wherein a trailing edge of the first OFDM symbol of the k consecutive OFDM symbols is aligned with a trailing edge of the second OFDM symbol of the n consecutive OFDM symbols.

29. The transmitter of claim 17, wherein the second subcarrier spacing is an integer multiple of the first subcarrier spacing.

30. The transmitter of claim 29, wherein the integer multiple is a power of two.

31. The transmitter of claim 17, wherein the first subcarrier spacing is 15 kHz×$2^i$, where i is an integer and i≥0, and wherein the second subcarrier spacing is 15 kHz×$2^j$, where j is an integer and j>i.

32. The transmitter of claim 17, wherein the transmitter is part of a base station.

* * * * *

UNITED STATES PATENT AND TRADEMARK OFFICE
CERTIFICATE OF CORRECTION

PATENT NO. : 10,728,072 B2
APPLICATION NO. : 16/229813
DATED : July 28, 2020
INVENTOR(S) : Islam et al.

It is certified that error appears in the above-identified patent and that said Letters Patent is hereby corrected as shown below:

In the Claims

In Column 34, Line 55, Claim 27, delete "symbol of then consecutive OFDM" and insert --symbol of the n consecutive OFDM--.

Signed and Sealed this
Seventeenth Day of November, 2020

Andrei Iancu
*Director of the United States Patent and Trademark Office*